(12) United States Patent
Narasimhan et al.

(10) Patent No.: US 12,460,630 B2
(45) Date of Patent: Nov. 4, 2025

(54) VALVE ASSEMBLIES, VALVE ASSEMBLIES FOR USE WITH DOWNHOLE PUMPS AND RELATED METHODS

(71) Applicant: CHAMPIONX LLC, Sugar Land, TX (US)

(72) Inventors: Ramamurthy Narasimhan, Dallas, TX (US); Juan Felipe Correa Pugliese, Fort Worth, TX (US); Riyadh Salloom, Arlington, TX (US); Randy De Werff, Burleson, TX (US); Bradley C. Rogers, Burleson, TX (US); Jimmy Kemp, Levelland, TX (US); Matthew Bishop, Burleson, TX (US)

(73) Assignee: CHAMPIONX LLC, Sugar Land, TX (US)

( * ) Notice: Subject to any disclaimer, the term of this patent is extended or adjusted under 35 U.S.C. 154(b) by 279 days.

(21) Appl. No.: 17/691,051

(22) Filed: Mar. 9, 2022

(65) Prior Publication Data
US 2022/0196007 A1 Jun. 23, 2022

Related U.S. Application Data

(63) Continuation-in-part of application No. 17/483,753, filed on Sep. 23, 2021.

(60) Provisional application No. 63/082,829, filed on Sep. 24, 2020.

(51) Int. Cl.
*F04B 53/10* (2006.01)
*F04B 19/04* (2006.01)
*F16K 15/04* (2006.01)

(52) U.S. Cl.
CPC .......... *F04B 53/1007* (2013.01); *F04B 19/04* (2013.01); *F04B 53/10* (2013.01); *F16K 15/048* (2013.01)

(58) Field of Classification Search
CPC ..... E21B 34/142; F16K 15/04; F04B 53/1007
See application file for complete search history.

(56) References Cited

U.S. PATENT DOCUMENTS

| | | | | |
|---|---|---|---|---|
| 1,555,068 | A | * | 9/1925 | Nixon ..................... F16K 15/04 137/533.15 |
| 2,003,679 | A | | 6/1935 | Crickmer |
| 2,085,360 | A | * | 6/1937 | Hammett ............ F04B 53/1002 137/533.13 |
| 2,354,255 | A | | 7/1944 | Gillum |

(Continued)

FOREIGN PATENT DOCUMENTS

| | | |
|---|---|---|
| CA | 2435601 A1 | 1/2004 |
| CA | 2849205 A1 | 10/2015 |

OTHER PUBLICATIONS

Office Action, U.S. Appl. No. 17/483,753 dated Mar. 7, 2024.

*Primary Examiner* — Reinaldo Sanchez-Medina
(74) *Attorney, Agent, or Firm* — BKRIP LLC

(57) ABSTRACT

Valve assemblies and related pumps and methods may include an insert disposed in an internal flow path of a casing where an outer surface of the insert is fixedly engaged with an inner surface the casing with fluid sealing. The insert includes protrusions, each individually extending into the internal flow path of the casing and converging at an apex of the insert to define a cage in which the restriction element is configured to move axially through the internal flow path.

20 Claims, 17 Drawing Sheets

(56) References Cited

U.S. PATENT DOCUMENTS

| | | | | |
|---|---|---|---|---|
| 3,724,496 | A * | 4/1973 | Secrist | F16K 15/04 |
| | | | | 137/533.13 |
| 5,178,184 | A | 1/1993 | Skillman | |
| 5,593,292 | A | 1/1997 | Ivey | |
| 6,899,127 | B1 | 5/2005 | Swingley | |
| 7,069,997 | B2 | 7/2006 | Coyes et al. | |
| 8,453,673 | B2 * | 6/2013 | Ford | F16K 27/0245 |
| | | | | 137/533.19 |
| 10,100,609 | B2 * | 10/2018 | Ford | E21B 43/127 |
| 10,767,445 | B2 | 9/2020 | Stachowiak, Jr. et al. | |
| 11,187,341 | B2 * | 11/2021 | Ford | F16K 27/0209 |
| 2005/0257927 | A1 | 11/2005 | Coyes | |
| 2010/0269928 | A1 | 10/2010 | Ford | |
| 2014/0334957 | A1 * | 11/2014 | Simmons | F04B 53/1002 |
| | | | | 417/559 |
| 2018/0291891 | A1 * | 10/2018 | Scopelite | F04B 15/02 |
| 2019/0032446 | A1 | 1/2019 | Gronning | |
| 2019/0353003 | A1 | 11/2019 | Stachowiak, Jr. | |
| 2020/0011154 | A1 | 1/2020 | Stachowiak, Jr. | |
| 2020/0141210 | A1 | 5/2020 | Rich | |
| 2020/0208503 | A1 | 7/2020 | Dyck | |
| 2021/0131423 | A1 * | 5/2021 | Valenzuela | F04B 47/06 |
| 2021/0131425 | A1 | 5/2021 | Kim et al. | |
| 2021/0246992 | A1 | 8/2021 | Ford | |
| 2021/0270381 | A1 | 9/2021 | Samayamantula | |
| 2021/0301621 | A1 | 9/2021 | Pola | |
| 2023/0203913 | A1 * | 6/2023 | Stachowiak, Jr. | F04B 53/125 |
| | | | | 137/533.11 |

* cited by examiner

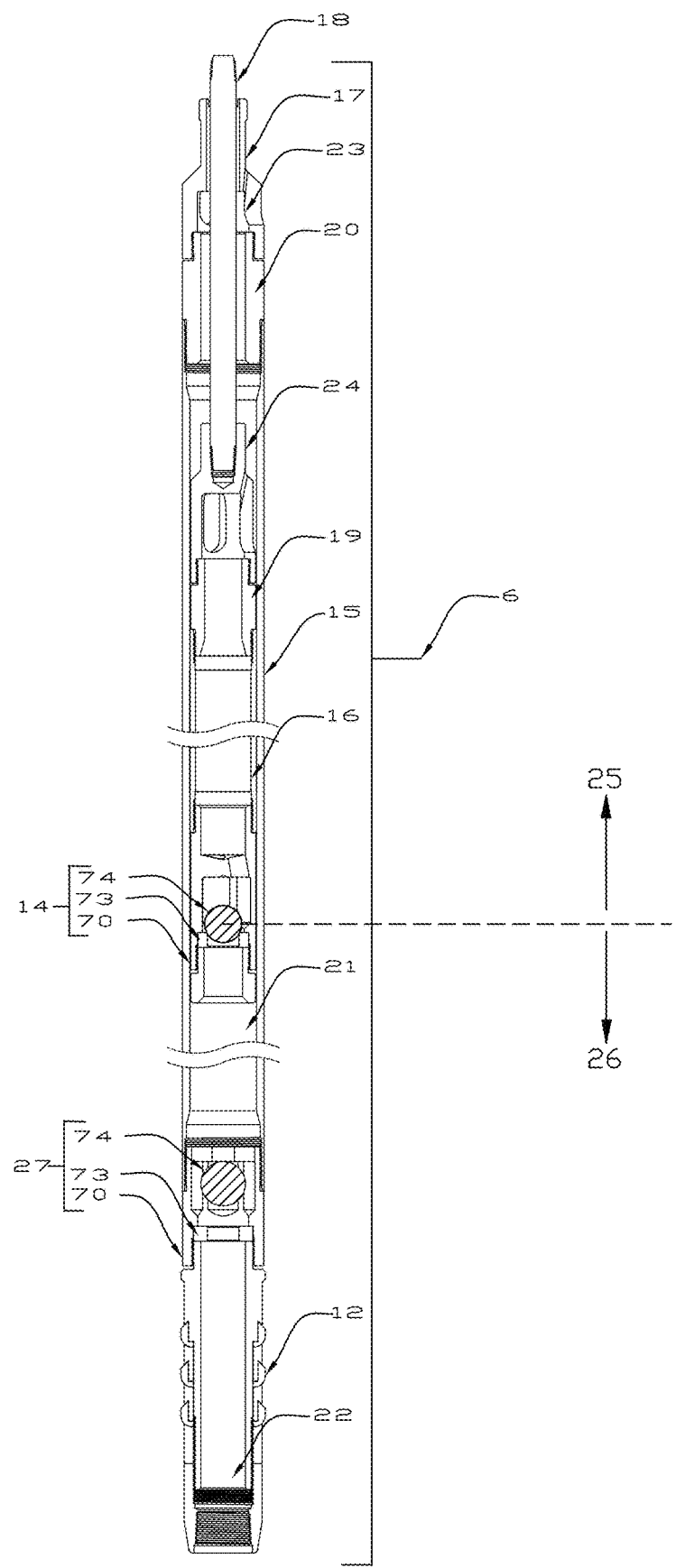

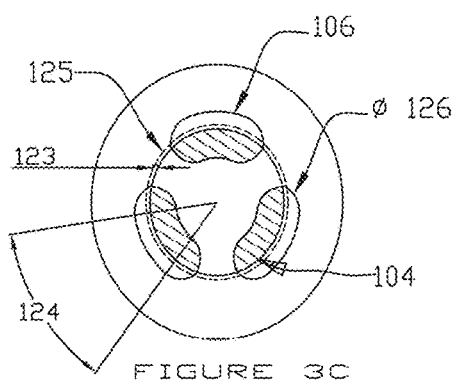
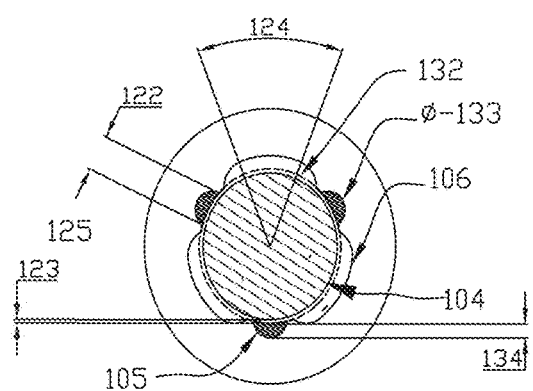
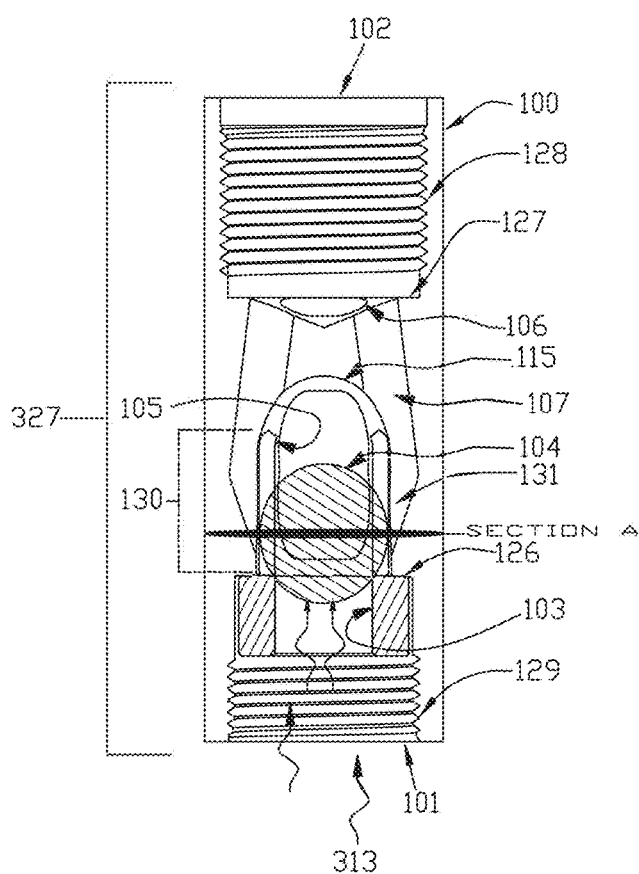
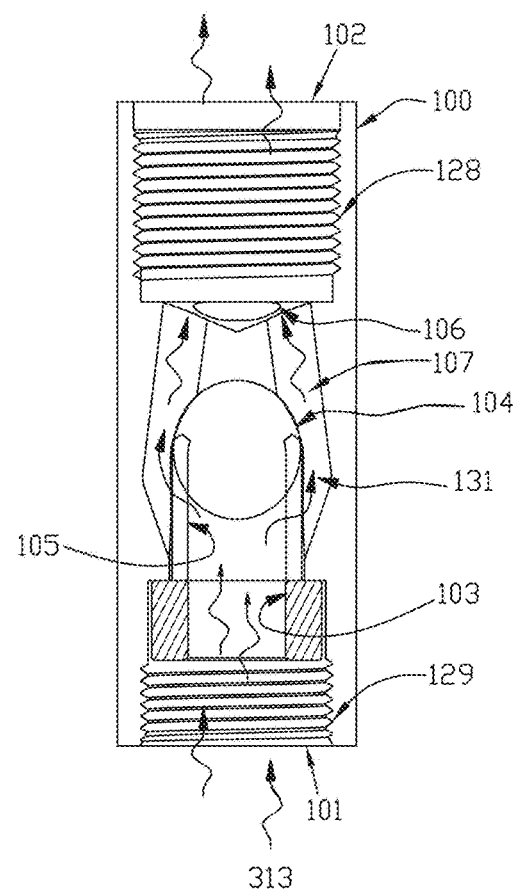

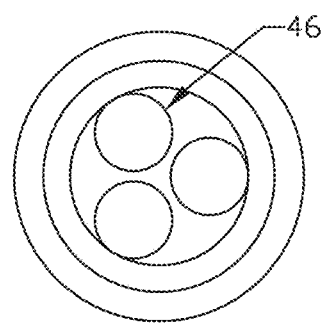
FIGURE 4B
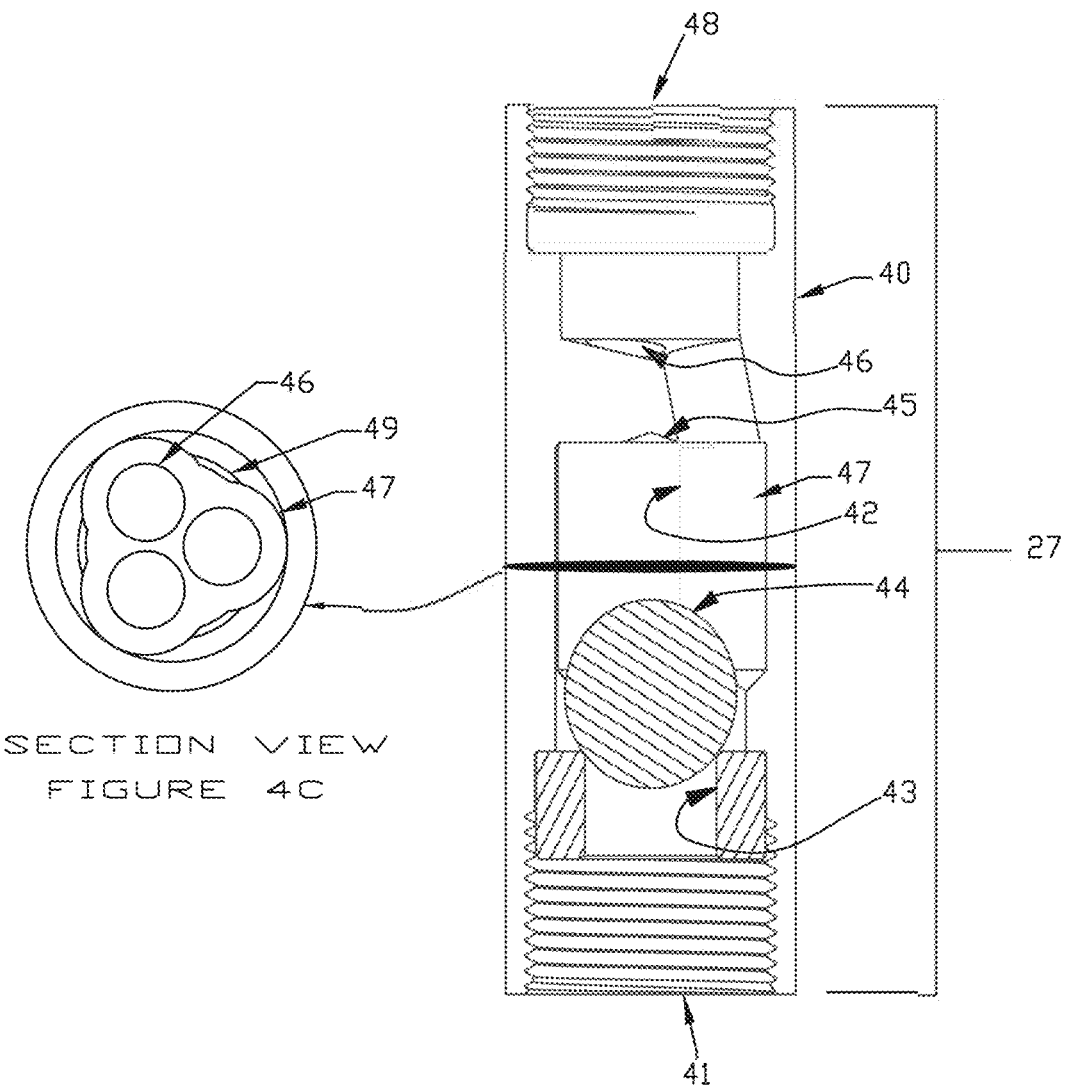
SECTION VIEW
FIGURE 4C
FIGURE 4A

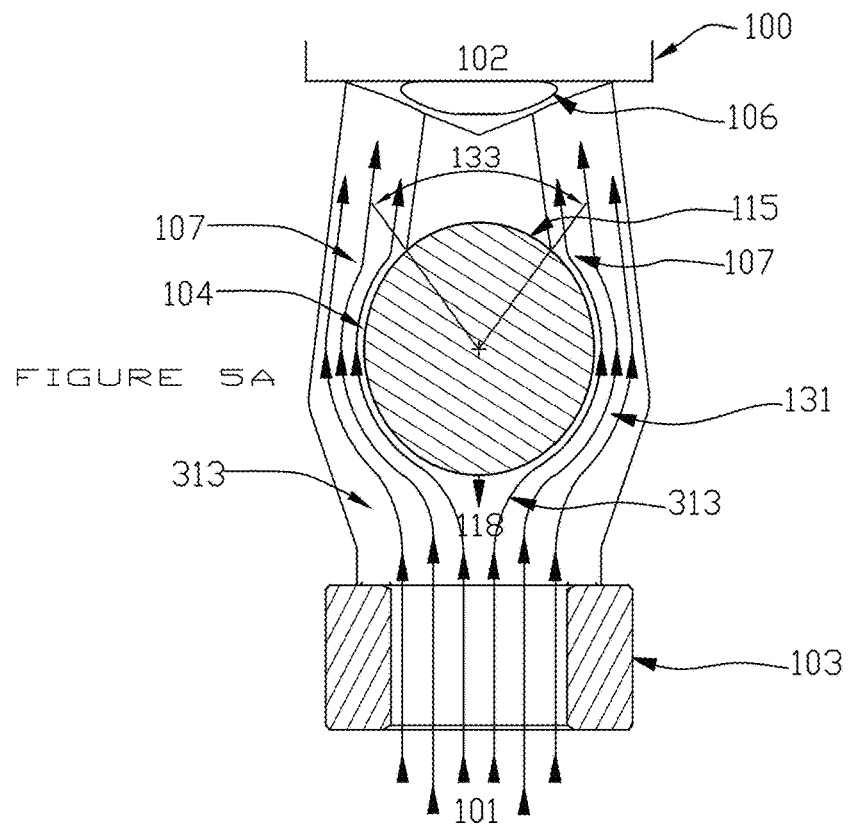
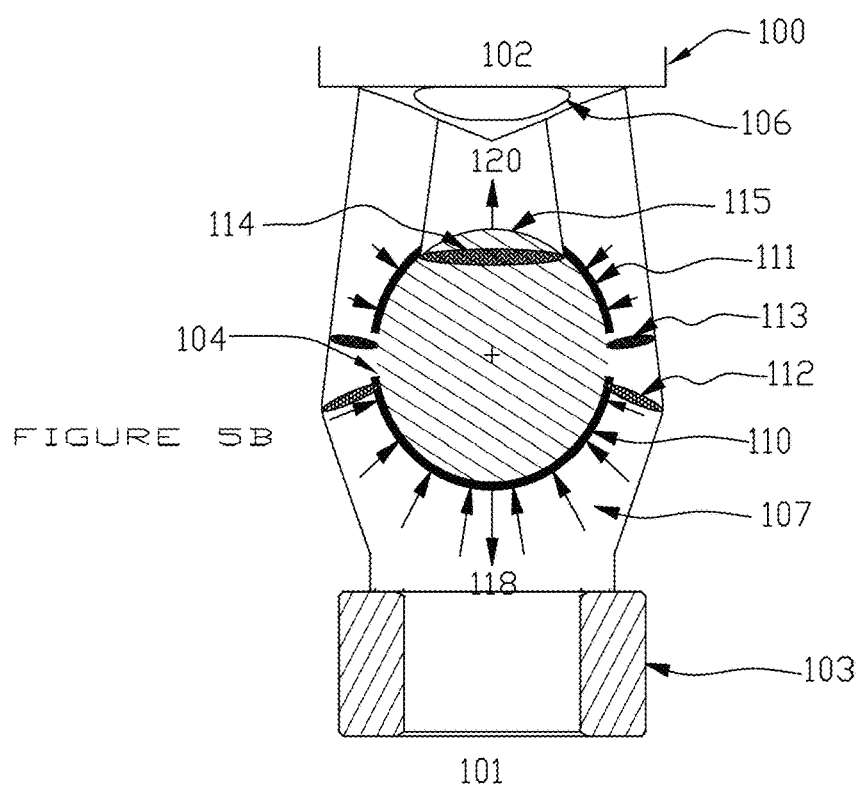

VALVE ASSEMBLIES, VALVE ASSEMBLIES FOR USE WITH DOWNHOLE PUMPS AND RELATED METHODS

CROSS-REFERENCE SECTION

This application is a continuation-in-part of U.S. patent application Ser. No. 17/483,753, filed on Sep. 23, 2021, which application claims priority to U.S. Provisional Application No. 63/082,829, filed on Sep. 24, 2020, the disclosure of each of which are hereby incorporated in their entirety by reference.

FIELD OF THE DISCLOSURE

The present disclosure relates, according to some embodiments, to downhole linear reciprocating pumps, such as that may be used to pump fluids through an oil well, from a reservoir beneath ground, to a surface location. Specifically, the present disclosure relates to check valves, which may be used in such pumps, and related systems and method.

BACKGROUND

The exploitation of hydrocarbons contained in the porous space of targeted sub-surface rock formations is often accomplished by drilling and completing boreholes, which establish a pathway for the formation fluids to be produced. Well fluids flow through the borehole up to the surface at a rate driven by a pressure differential, which may be connate to the produced rock formation or may be imparted by any form of artificial lift system. Among the multiple artificial-lift methods available in the industry, the utilization of linear-reciprocating pumps, commonly known as sucker-rod pumps, prevails nation and worldwide.

Sucker-rod pumps typically comprise a plunger reciprocating inside a barrel with each of them connected to a one-way check valve thereby forming an internal compression chamber. Sucker-rod pumps operate on the positive-displacement principle; admitting a parcel of fluids from a low-pressure reservoir and into the compression chamber during the first half of the stroke, thereafter, releasing the fluid to the high-pressure outlet during the second half of the stroke. The reciprocating action of the plunger drives the expansion and the contraction of the compression chamber, while the synchronous action of the two check valves controls the admission and the discharge of the fluids. Ball-type one-way check valves comprising a ball and a seat disposed inside a cage (or cylindrical casing) are nowadays an industry standard.

The performance and the runtime of sucker-rod pumps are influenced by several factors, among many others; corrosion, gas-interference, abrasion, embedded solids, cyclic fatigue, and highly demanding operational parameters are among the top-ranked challenges endured by downhole pumps, and by extension endured by all of their sub-components including to-be-disclosed ball-type check valves.

SUMMARY

Disclosed are embodiments of improved ball-type check valves and their associated components. The disclosed embodiments include aspects which alone or in conjunction with each other provide improved durability, speed of actuation, and reduced pressure-drops or pressure gradients within the components of the check valves of the present disclosure.

Disclosed embodiments of the present application include fluid dynamic forces of production fluid around the ball of the disclosed embodiments, such that there are lowered fluid pressure acting normal to the ball surface in areas where there is faster movement of fluids around the ball. As the fluid passages are designed in the disclosed embodiments, accordingly, there is a reduced pressure on the upper section of the ball as it moves through disclosed cylindrical casings. Further, an increased effective area of differential pressure is provided whereby there is an increased hydrodynamic lifting force on the ball, improving the speed of action for a given ball-race length or alternatively providing for a lessened ball-length distance for a given desired actuation time.

Disclosed embodiments allowing for shortened ball-races also provide for reduced speed and therefore reduced kinetic energy of the ball when it hits a ball-stop within disclosed cylindrical casings of the embodiments. Not only does this approach in and of itself provide improved durability, but in combination with other elements of this disclosure relating to hard-lining of ball guides and ball-stops this provides a synergistic improvement in durability.

Further disclosed in the present application are improved ball-stop geometries that provide more durability and effective sealing over the life of the disclosed ball-type check valves. Again, this provides a synergistic combination along with the reduced ball-race length.

Further disclosed in the present application are embodiments having improved flow passage geometries, both providing converging & diverging flow-passages that with other described features provide the advantageous differential pressures and hydrodynamic lifting forces. Further flow passage geometry improvements in disclosed embodiments include flow passage cross-sections that can in some embodiments be described as having a "quartic curve" profile as described herein, or have other non-circular or non-oval profiles that are similar to such quartic curves. Without limitation, such passage profiles are sometimes referred to herein as being "bean-shaped." These profiles work with other disclosed aspects to provide improved dynamic fluid pressure on the balls for a given area. And as described herein, the improved dynamic fluid pressure synergistically provides for shorter actuation times and reduced kinetic energy in the collisions between the balls, and the ball-stops.

Further disclosed in the present application are ball guides that are designed to prove a synergistically determined relationship between the flow-passages. These ball guides contain the ball within the ball-race with close tolerances, and with the fluid dynamics described herein relative to the flow-passages, provides a reduced "rattle" as the ball travels though the ball-race. Again, this improves durability of the disclosed embodiment ball-type check valves along with other synergistic combinations of features described herein.

The present disclosure relates to a ball check valve assembly (e.g., a standing valve) may include (a) a ball; and (b) a casing. The casing may include an outer surface and defining an internal cavity extending within the casing, the internal cavity including a cylindrical inner wall. A ball check valve assembly may include (c) a bottom threaded connection at a downhole end of the casing; and (d) a top threaded connection at an uphole end of the casing. A ball check valve assembly may comprise (e) at least three longitudinally extending guides defined within internal cylindrical cavity, the at least three longitudinally extending guides defined as longitudinal ridges extending inwards from the cylindrical inner wall and defining a ball-race whereby the ball has freedom of motion coaxially within the internal cylindrical cavity, the ball-race allowing movement of the ball to the top of the ball-race during a upstroke and allowing movement of the ball to the bottom of the ball-race during a downstroke; and (f) a sealing surface formed in the casing and interposed between the top threaded connection and the internal cavity, the sealing surface formed as a concave wall facing the internal cavity and generally closing an area between the internal cavity and the top threaded connection, the sealing surface further defining at least three quartic-shaped flow-passages extending from the sealing surface and providing for fluid passage through the sealing surface from the internal cavity to the uphole end of the casing, the sealing surface may further include concavity matching a diameter of the ball whereby the at least three quartic-shaped flow-passages are substantially closed by the ball during the downstroke.

In some embodiments, a sucker-rod pump may include (a) a barrel including an interior cavity with a surface, the barrel configured to house a plunger, a valve rod, and at least one ball check valve assembly (e.g., a traveling valve). The sucker-rod pump may include (b) the valve rod mechanically connected to an upper end of the plunger and configured to drive the plunger up and down the sucker-rod pump; and (c) a hold-down assembly attached to a bottom of the barrel and configured to maintain position of the sucker-rod pump components as the plunger may be driven up and down. The sucker-rod pump may include the at least one ball check valve assembly including: (a) a ball; and (b) a casing. The casing may include an outer surface and defining an internal cavity extending within the casing, the internal cavity including a cylindrical inner wall. A ball check valve assembly may include (c) a bottom threaded connection at a downhole end of the casing; and (d) a top threaded connection at an uphole end of the casing. A ball check valve assembly may comprise (e) at least three longitudinally extending guides defined within internal cylindrical cavity, the at least three longitudinally extending guides defined as longitudinal ridges extending inwards from the cylindrical inner wall and defining a ball-race whereby the ball has freedom of motion coaxially within the internal cylindrical cavity, the ball-race allowing movement of the ball to the top of the ball-race during a downstroke and allowing movement of the ball to the bottom of the ball-race during an upstroke; and (f) a sealing surface formed in the casing and interposed between the top threaded connection and the internal cavity, the sealing surface formed as a concave wall facing the internal cavity and generally closing an area between the internal cavity and the top threaded connection, the sealing surface further defining at least three quartic-shaped flow-passages extending from the sealing surface and providing for fluid passage through the sealing surface from the internal cavity to the uphole end of the casing, the sealing surface may further include concavity matching a diameter of the ball whereby the at least three quartic-shaped flow-passages are substantially closed by the ball during the downstroke. The sucker-rod pump further comprises two ball check valves.

In some embodiments, the casing may be composed of a material including a low alloy steel, brass alloy, stainless steel alloy, a duplex stainless steel, a nickel base alloy, a Monel (e.g., a nickel alloy), and n super alloy. The casing may include a surface treatment including at least one of electroplating, electroless plating, chemical vapor deposition, physical vapor deposition, plasma coatings, spray-metal coatings, solid-state diffusion treatments, and surface heat-treat processes. The casing may be machined from at least one of a bar stock, a powder-sintered blank, a casted blank, and a forged blank. An outside diameter of the casing may be from about 1 inch to about 6 inches. In some embodiments, the casing has a length ranging from about 3 inches to about 10 inches.

In some embodiments, each of the quartic-shaped flow passages may be symmetrically arranged around a longitudinal axis of the insert. The insert may be composed of a material including a low alloy steel, brass alloy, a stainless steel alloy, a duplex stainless steel, a nickel base alloy, a Monel (e.g., a nickel alloy), and a super alloy. The insert may include a surface treatment including at least one of electroplating, electroless plating, chemical vapor deposition, physical vapor deposition, plasma coatings, spray-metal coatings, solid-state diffusion treatments, and surface heat-treat processes. The insert may be machined from at least one of a bar stock, a powder-sintered blank, a casted blank, and a forged blank. An outside diameter of the insert may be from about 0.5 inch to about 4 inches. In some embodiments, the insert has a length ranging from about 1 inches to about 6 inches.

A cross-section of each of the quartic-shaped flow passages comprise one of a bean-curve shaped flow passage and a lima bean curve shaped flow passage. The at least three quartic-shaped flow-passages comprise at least one of: four quartic-shaped flow-passages, five quartic-shaped flow-passages, six quartic-shaped flow-passages, seven quartic-shaped flow-passages, eight quartic-shaped flow-passages, nine quartic-shaped flow-passages, and ten quartic-shaped flow-passages. The at least three flow-passages may be configured to form complex 3D conduits disposed circumferentially around a longitudinal axis of the casing. The at least three flow-passages may be configured to provide an open area for a fluid to circumvent restriction by the ball. The ball may be made from a material including a cobalt alloy, a martensitic stainless steel, a ceramic, a tungsten carbide, and a chromium carbide. The diameter of the ball may be from about 0.500 inches to about 3.500 inches.

According to some embodiments, a ball-type check valve assembly may include a ball-stop attached to the at least three longitudinally extending guides and including a concave geometry. A diameter of the ball-race may be larger near the ball-stop than it may be near the seat. A length of the ball-race may be about 0.50 to about 0.75 times the ball diameter. A contact surface between the ball-stop and the ball has an angular spam ranging from about 60° to about 160°. At least three longitudinally extending guides comprise at least one of a stainless steel, a cobalt alloy, a polymer, a chrome alloy, and a nickel alloy.

In some aspects, the techniques described herein relate to a valve assembly including: a restriction element; a casing defining an internal flow path through the casing, the casing including at least one axial connection for connecting with a component of a fluid-handling device; an insert disposed in the internal flow path through the casing, an outer surface of the insert being fixedly engaged with an inner surface the casing, the insert including at least three axially extending protrusions, each of the at least three axially extending protrusions individually extending inward into the internal flow path of the casing and converging with at least another of the at least three axially extending protrusions at an apex of the insert to define a cage in which the restriction element is configured to move axially through the internal flow path; and a seat positioned opposite to the apex of the insert to contain the restriction element in the insert; wherein: in an open position, the restriction element is configured to be displaced toward the apex of the insert to enable fluid flow through the internal flow path and through openings defined between the at least three axially extending protrusions; and in a closed position, the restriction element is configured to engage with the seat to restrict fluid flow through the internal flow path.

In some aspects, the techniques described herein relate to a downhole pump including: a barrel including an interior cavity; a plunger; a valve rod mechanically connected to the plunger and configured to drive the plunger within the interior cavity of the barrel; and at least one valve assembly. The at least one valve assembly including: a restriction element; a casing coupled to the barrel as a standing valve or to the plunger as a traveling valve, the casing defining an internal flow path through the casing that is in communication with the interior cavity of the barrel; and an insert having an outer surface that is fixedly engaged with an inner surface the casing, the insert including at least two ribs, each individually extending from a base portion of the insert to an apex of the insert where each of the at least two ribs converge to define a cage in which the restriction element is configured to move axially through the internal flow path between the apex and a seat positioned in the casing axially opposite the apex; wherein, in an open position, the restriction element is configured to be displaced toward the apex of the insert to enable fluid flow through the internal flow path of the casing and through openings defined between the at least two ribs; and wherein, in a closed position, the restriction element is configured to restrict fluid flow through the internal flow path.

In some aspects, the techniques described herein relate to a method of forming a valve assembly, the method including: positioning a restriction element within a casing between an insert and a seat, positioning the restriction element, the insert, and the seat in an internal flow path through the casing; fixedly engaging an outer surface of the insert with an inner surface the casing via an interference fit; defining openings in the internal flow path with at least three protrusions of the insert that extend through the internal flow path of the casing and converge with at least another of the at least three protrusions at an apex of the insert to define a cage in which the restriction element is configured to move axially through the internal flow path; in an open position, enabling the restriction element to be displaced toward the apex of the insert to enable fluid flow through the internal flow path and through openings defined between the at least three protrusions; and in a closed position, enabling the restriction element to engage with the seat to restrict fluid flow through the internal flow path.

BRIEF DESCRIPTION OF THE DRAWINGS

Exemplary embodiments of the present disclosure are described herein with reference to the drawings, wherein like parts are designated by like reference numbers.

FIG. 2 illustrates a longitudinal cross-sectional view of a general sucker-rod pump configuration, according to an example embodiment of the disclosure;

FIG. 3A illustrates a longitudinal cross-sectional view of a current embodiment ball-type check valve in the closed position, comprising a ball-race, a ball-stop, multiple flow-passages, and top and bottom threaded connections, according to an example embodiment of the disclosure;

FIG. 3B illustrates the same cylindrical casing of FIG. 3A but in the open position, showing the direction of the flow, according to an example embodiment of the disclosure;

FIG. 3C illustrates a transversal cross-sectional view of the cylindrical casing in FIG. 3A, with the cut line passing through the center of the ball. Three circumferentially elongated flow-passages and an equal number of guides symmetrically distributed along the cylindrical casing longitudinal axis are depicted, according to an example embodiment of the disclosure;

FIG. 3D illustrates a top view of the cylindrical casing in FIG. 3A, depicting circumferentially elongated flow-passages, according to an example embodiment of the disclosure;

FIG. 4A illustrates a longitudinal cross-sectional view of a prior art cylindrical casing with the ball in the closed position, according to an example embodiment of the disclosure;

FIG. 4B illustrates a top view of the prior art cylindrical casing of FIG. 4A, depicting three round flow-passages symmetrically distributed along the cylindrical casing longitudinal axis, according to an example embodiment of the disclosure;

FIG. 4C illustrates a transversal cross-sectional view of the prior art cylindrical casing in FIG. 4A, with the cutting line passing above the ball while in the closed position, according to an example embodiment of the disclosure;

FIG. 5A illustrates a transversal cross-sectional view of a valve in the open position, depicting an artistic representation of the flow field, according to an example embodiment of the disclosure;

FIG. 5B illustrates a transversal cross-sectional view of a valve in the open position, defining some relevant areas along the flow-passages and depicting the hydrodynamic forces acting on the ball, according to an example embodiment of the disclosure;

FIG. 7A illustrates a straight ball-race profile with or without hard-lining, according to an example embodiment of the disclosure;

FIG. 7B illustrates a tapered-out ball-race profile with or with-out hard-lining, according to an example embodiment of the disclosure;

FIG. 7C illustrates a straight ball-race profile with an insert-style guide, according to an example embodiment of the disclosure;

FIG. 7D illustrates a tapered-out ball-race profile with an insert-style guide, according to an example embodiment of the disclosure;

DETAILED DESCRIPTION OF THE DRAWINGS

The present disclosure relates, in some embodiments, to check valves, for example, as used in downhole reciprocating sucker-rod pumping systems that produce oil from oil wells. It should be appreciated, however, that the scope of the claims issuing from this specification shall determine the disclosure as hereinafter claimed, and that this statement of certain embodiments should not be used to narrow the disclosure.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

Figure 1:
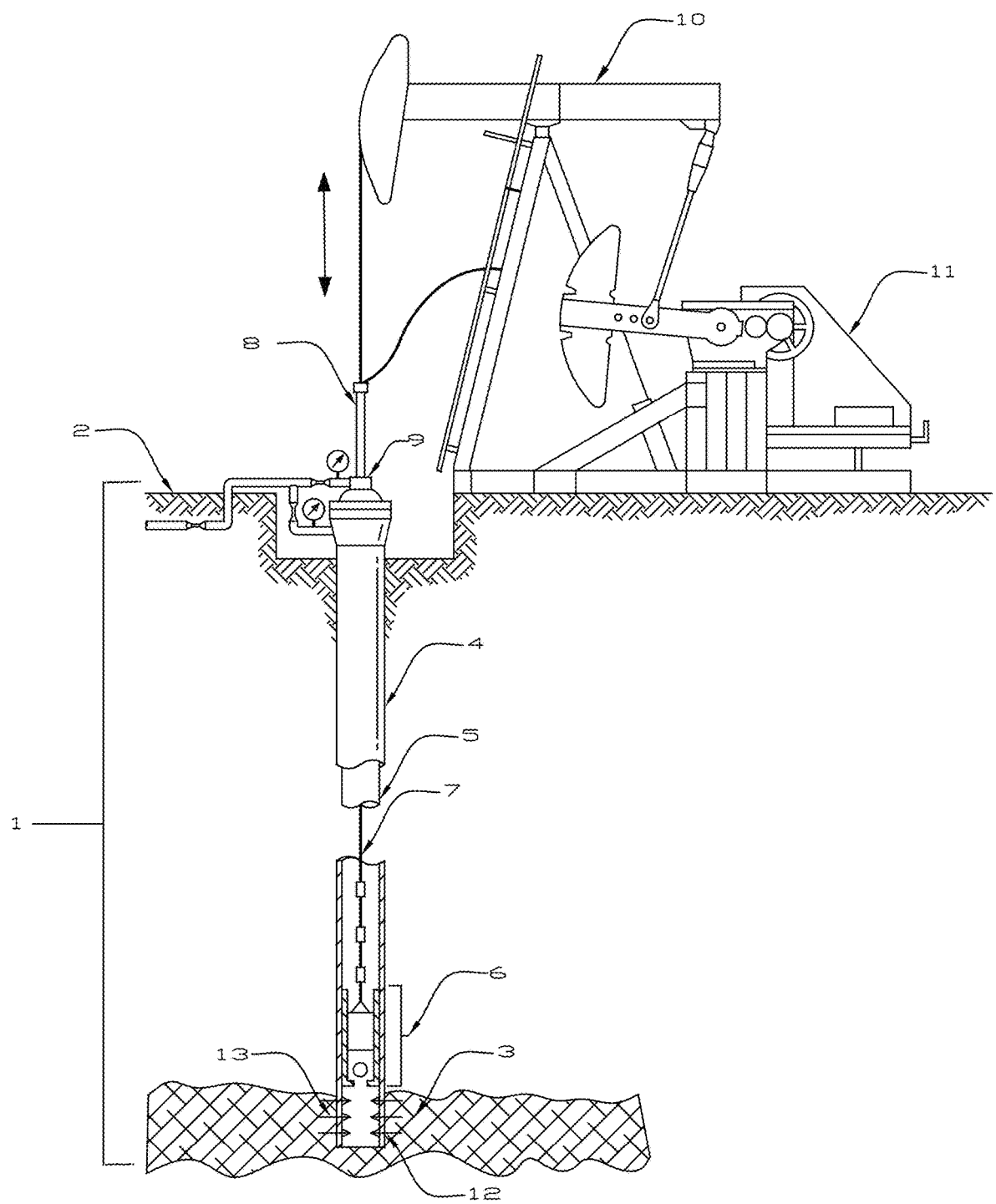
FIG. 1 illustrates a general sucker-rod pumping system, according to an example embodiment of the disclosure.

FIG. 1 illustrates a general sucker-rod pumping system for a producing oil well 1. The well has a borehole that extends from the surface 2 and into the earth, past an oil-bearing formation 3. A string of tubing known as casing 4 runs through the borehole 1 and it is often cemented in place to seal the well from the surroundings. The casing is purposely perforated 12 at the targeted formation 3 to open a path exclusively for the formation fluids 13 to flow into the well. A string of tubing 5 extends inside of the casing from the formation 3 to the surface 2.

A subsurface pump 6 is located inside or below the tubing 5 at or near the targeted formation 3. A string of sucker rods 7 extends from the pump 6 up inside of the tubing 5 to a polished rod 8, which rests on the carrier bar of the pumping unit 10. The stuffing box 9 located on the surface 2 provides a dynamic seal against the polished rod 8 external diameter, containing the well pressure and preventing the spillage of well fluids to the surface 2. The beam pumping unit 10 reciprocates up and down due to a prime mover 11, such as an electric motor or a gasoline, gas, or diesel engine, and the reciprocation action is transferred to the downhole pump 6 through the sucker-rod string 7.

Sucker-rod pumps exert mechanical work on the well fluids, adding the pressure head necessary for the fluids to reach the surface 2. Well fluids circulate through the sucker-rod pump in packets, with fluids typically admitted to the pump during the upstroke and ejected during the downstroke.

Sucker-rod pumps 6 can be installed in almost any section of the well 1, although they are typically landed close to the casing perforations 12. Pumps installed in a straight vertical section of the well typically outperform pumps installed in inclined, curved, or horizontal sections. Sucker-rod pumps 6 typically admit fluids from the bottom end (down well) and discharge the fluids from the top end of the pump. Since pump 6 may be placed in non-vertical sections of the well, "top" and "bottom" labels may become unclear, hence, in the present disclosure "top" refers to the uppermost point or the point closest to the surface 2 along path of the well. Similarly, "bottom" refers to the lowermost point or the point farthest from the surface 2 along the path of the well. Further, when used herein in reference to a location in the wellbore, the terms "above," "upper," and "uphole" mean and include a relative position proximate the surface of the well, whereas the terms "below," "lower" and "downhole" mean and include a relative position distal the surface of the well.

FIG. 2 illustrates a cross-sectional view of a sucker-rod pump 6 configuration including five different functional components; a barrel 15, a plunger 16, a valve rod 18, a hold-down assembly 12, and two or more check valves 27, 14. A functional component typically connects to another functional component by matching internal and external threads, or in some instances, bushings, couplings, or connecters 19, 20 interface between the non-matching threaded connections on two given functional components. Supporting components such as valve rod guides 17 and top plunger connectors 24 fulfill a non-primary function for extending the life or improving the performance of the pump. A typical sucker-rod pump 6 operates similarly to a linear reciprocating piston pump. The plunger 16 with a polished outside diameter (OD) reciprocates inside the barrel 15 with a polished inside diameter (ID). The tight clearance between the two polished surfaces creates a dynamic fluid seal. The barrel 15 is typically affixed to the tubing 5 by a hold-down assembly 12, while the plunger 16 is typically connected to the valve rod 18, which in turn connects to the sucker-rod string 7. The barrel 15 and the plunger 16 are each connected to a check valve 27, 14, with the valve connected to the barrel 15 commonly referred to as the "standing valve" 13, and the valve connected to the plunger 16 commonly referred to as the "travelling valve" 14. An alternate pump configuration may use a plunger 16 fixed to the tubing 5 by a hold-down assembly 12, and a reciprocating barrel 15 connected to the sucker-rod string 7, in which case the "travelling" and "standing" designations will be inverted. In either case, a minimum of two valves are generally required in a typical sucker-rod pump assembly. The hold-down assembly 12 may be configured to maintain position of the sucker-rod pump components as the plunger 16 is driven up and down. A ball-type check valve 27, 14 including one or more restriction elements (e.g., a ball-type check valve) as commonly used in sucker-rod pumping applications consists of a ball 104, a seat 103, and either a single or a multi-piece cylindrical casing 100, the later acting as the casing for the ball 104 and the seat 103. Ball-type valves 27, 14 are the most commonly used in sucker-rod pumps, and a new cylindrical casing 100 design for such application is the subject of the present disclosure.

Although embodiments of the disclosure discuss the particular use of a ball, in additional embodiments, other restriction devices or elements may be implemented.

A compression chamber 21 is formed inside the barrel 15 in the volume enclosed between the two check valves 27, 14. The volume of the compression chamber expands during the upstroke and shrinks during the downstroke movements of the plunger 16. The pumping cycle begins with the plunger 16 in the bottom dead center of the stroke and moving upwards. During the upstroke movement, well fluids 13 enter the pump 6 from the bottom inlet 22, flowing through the opened standing valve 27 and into the compression chamber 21. Meanwhile, the travelling valve 14 remains closed due to the hydrostatic fluid column on top. Fluids 13 are driven into the compression chamber 21 by a transient drop in the pressure caused by the expanding volume of the chamber during the upstroke. Upon reaching the top dead center the standing valve 27 closes as the expansion of the compression chamber 21 ceases, and the plunger 16 begins to move downwards transferring the hydrostatic load from the travelling valve 14 to the standing valve 27, forcing the standing valve 27 to close and compressing the fluid 13 trapped in the chamber 21. At some point during the downstroke, the pressure inside the compression chamber 21 and the pressure on top of the travelling valve 14 will equalize, forcing the travelling valve 14 to open and the fluid in the shrinking compression chamber 21 to flow out of it. The next pumping cycle begins when the plunger 16 reaches the bottom dead center.

Check valves in sucker-rod pumps are actuated by pressure differentials in the fluid exceeding the cracking pressure of the valve. In an ideal scenario the travelling- and the standing valves 27, 14 operate synchronously, with one valve opening while the other one closes, ensuring that at no point in time there will be a direct connection between the high-pressure outlet 23 and the low-pressure inlet 22 of the pump 6. Similarly, at no point in time will both valves be in the closed position. In real life, the valves do not react instantaneously to a given pressure differential and multiple factors may delay their opening or closing, among many others factors; the ball weight, the fluid drag, the orientation of the pump, the compressibility of the fluids, the flowrate, the presence of solids in the fluid, and the deterioration of the ball and seat seals will be the most impactful. Any delay in the actuation of the valves 27, 14 will reduce the volumetric efficiency of the pump 6.

All the components of the pump 6 that are in contact with moving fluids offer some sort of restriction to the flow causing a non-reversible pressure-drop. Even though the pump design can be optimized to reduce the impact of frictional pressure-losses in the performance of the system, pressure-losses are inherent to the flow of fluids and they cannot be eliminated altogether. The performance of the pump is especially sensitive to frictional pressure losses in the low-pressure region 24 of the pump 6; which encompasses all the components between the intake and the compression chamber 21. In the low-pressure region 24 of the pump 6 the fluids may reach the lowest pressure point in the system, which may cause volatiles compounds in the well fluids to flash out forming or expanding the gaseous phase, filling the compression chamber 21 and preventing the desirable entry of incompressible liquids. A compression chamber 21 filled with compressible fluids translates into lower production rates, which is costly and therefore undesirable from an operational standpoint. Nonetheless sucker-rod pumps 6 are designed to pump incompressible liquids, they can handle a certain amount of compressible fluids including volatile compounds and even a free-gas phase, that is, subject to a lower volumetric efficiency and potentially a shorter run life.

Cylindrical casings 100 (e.g., housings, or housing portions) used in sucker-rod pumps undergo cyclical mechanical stresses induced by the loads and pressures imposed by the application. Cylindrical casings 100 may be mechanically loaded in tension, compression, shear, and/or torsion. The specific state of stresses in a cylindrical casing 100 varies depending on the type of cylindrical casing (travelling, standing, open-type, closed-type) as well as on the operational parameters of the pump 6.

FIG. 3A illustrates a cross-sectional view of a check valve assembly 327, including a matching size ball 104 and seat 103, and a cylindrical casing 100 according to a specific embodiment of the disclosure. The ball 104 is shown resting against the lapped sealing surface of the seat 103, which defines the closed position of the check valve assembly 327.

Disclosed cylindrical casings 100 generally have a cylindrical shape with an OD ranging from 1 inch to 6 inches, or even greater. The OD of the cylindrical casing 100 is determined by the size of the pump, with pumps sizes generally following guidelines provided by the American Petroleum Institute. Including both API or non-API configurations, common pump sizes in inches are as follow; about 1 inch, about 1 1/16 inches, about 1 1/4 inches, about 1 1/2 inches, about 1 3/4 inches, about 1 25/32 inches, about 2 inches, about 2 1/4 inches, about 2 1/2 inches, about 2 3/4 inches, about 3 1/4 inches, about 3 1/2 inches, about 3 3/4 inches, about 4 3/4 inches, about 5 3/4 inches, and about 6 inches, where about includes plus or minus 1/8 inches. In some embodiments, a cylindrical casing may have an outside diameter of about 1 inches, or about 1 1/16 inches, about 1 1/4 inches, about 1 1/2 inches, about 1 3/4 inches, about 1 25/32 inches, about 2 inches, about 2 1/4 inches, about 2 1/2 inches, about 2 3/4 inches, about 3 1/4 inches, about 3 1/2 inches, about 3 3/4 inches, about 4 3/4 inches, about 5 3/4 inches, and about 6 inches, where about includes plus or minus 1/8 inches. Cylindrical casings 100 can have a length ranging from about 3 inches to about 10 inches, or even greater. For example, a cylindrical casing 100 can have a length of about 3 inches, or about 3.5 inches, or about 4.0 inches, or about 4.5 inches, or about 5 inches, or about 5.5 inches, or about 6 inches, or about 6.5 inches, or about 7 inches, or about 7.5 inches, or about 8 inches, or about 8.5 inches, or about 9 inches, or about 9.5 inches, or about 10 inches, where about includes plus or minus 0.25 inches.

Disclosed cylindrical casings 100 connect to other components of the sucker-rod pump by external and/or internal threads. The cylindrical casing 100 of FIG. 3A illustrates a top, internally threaded connection 128 matching the threads of a barrel, and a bottom internally threaded connection 129 matching the threads on a hold-down assembly. A top internally threaded connection 128 may incorporate a top sealing surface 127 and a bottom internally threaded connection 129 may incorporate a bottom sealing surface 126. Additionally, the bottom connection 129 is sized to snugly fit the OD of the seat 103. Furthermore, threaded connections in sucker-rod pump valves may be compliant with one or multiple industry standards such as; ANSI-fine (UNF) or -coarse (UNC) specifications, tapered thread specifications (NPT), or ISO metric thread specifications. Threads machined per API specifications for line-pipe threads (LP), modified line-pipe threads (MLP), tubing threads, sucker-rod threads, or polished-rod threads may as well be used on the top or the bottom connection of the cylindrical casing 100. Note that for pump components not illustrated in FIG. 3A, please refer to their locations and descriptions as associated with FIGS. 1 and 2.

Disclosed cylindrical casings 100 may be installed on their mating components by applying torque to the threaded connections 128, 129, which creates a compressive force on the sealing surfaces 126, 127 of the cylindrical casing 100 providing a fluid seal that is substantial for the intended downhole application. The torque may be applied or counteracted on the cylindrical casing by a friction wrench sized for the specific OD of the cylindrical casing 100. Alternatively, some cylindrical casing embodiments may incorporate a pair of parallel flat surfaces located equidistant to the cylindrical casing axis on diametrically opposed planes or "flats," to allow for standard flat-wrenches to be using for installing or removing the cylindrical casing from the mating components. Disclosed cylindrical casings may or may not exhibit flats.

Disclosed cylindrical casings 100 can be manufactured in different materials, including but not limited to; low alloy steels such as AISI 8620/8630, free machining brass such as CDA 360, austenitic stainless steels such as AISI 303, 304, or 316, duplex stainless steels such as 2205 or 2304, and nickel alloys such as Monel or Inconel. Disclosed cylindrical casings may be machined from bar stock, as well as from powder-sintered, casted, or forged blanks. Furthermore, in disclosed embodiments additive manufacturing methods may be used as a part of fabricating described embodiment cylindrical casings.

As disclosed herein, the corrosion and abrasion properties of the base material in disclosed cylindrical casings 100 may be improved by the application of thin-layer coatings or surface treatments, internally and/or externally. Such processes may include electroplating, electroless plating, chemical and physical vapor deposition, plasma coatings, spray-metal coatings, solid-state diffusion treatments, surface heat-treat processes, among others.

Disclosed cylindrical casings 100 allow for the thru flow 313 of well fluids by three or more flow-passages 106 connecting the entry 101 and the exit 102 of the cylindrical casing. The cylindrical casing 100 may include three flow-passages 106, four flow-passages 106, five flow-passages 106, six flow-passages 106, seven flow-passages 106, eight flow-passages 106, nine flow-passages 106, ten flow-passages 106, or more. The flow-passages 106 are complex 3D conduits disposed circumferentially around the longitudinal axis of the cylindrical casing 100, providing an open area for the fluids to circumvent the restriction offered by the ball 104. Subject to application and manufacturability constraints, the flow-passages 106 in described cylindrical casings 100 are sized to provide the largest flow area possible, thereby reducing the pressure-drop experienced by the fluids flowing through 313.

Disclosed cylindrical casings 100 exhibit an internal cylindrical cavity coaxially oriented with the part, henceforth defined as the ball-race 130 (e.g., a portion of the casing 100 or housing in which the ball may travel or through which the ball may at least partially move), and which houses the ball 104 limiting its radial and longitudinal travelling during operation. The ball-race 130 can be parameterized in terms of its diameter and its length, with both parameters configured to synergistically enhance the functionality of the check valve assembly 327. The ball-race 130 is formed by guides 105 circumferentially arranged around the ball-race diameter. The guides 105 may be interspaced with the flow-passages 106 and the two compete for the limited space inside the cylindrical casing 100, meaning that an increase the in the flow area of the flow-passages 106 carries as well a decrease in the width of the guides 105, and in a similar fashion the other way around. Described guides 105 may be formed of the same material as the cylindrical casing 100, or they may be hard-lined or coated with another material for the purposes of improving their mechanical properties.

The top end of the ball-race 130 in the described cylindrical casings 100 exhibits a concave profile with a diameter equal to or marginally larger than the diameter of the ball 104 used, such feature henceforth defined as the ball-stop 115. The geometry ball-stop 115 geometry in disclosed cylindrical casings an innovation in the field of the application, and it is further described later in the present document.

The seat 103 as illustrated in FIG. 3A is lapped to receive a specific ball 104 size, creating a fluid seal when the two come in contact. The ball 104 is by definition and by construction symmetric around its center, providing an "infinite seal," given that a fluid seal can be accomplished regardless of its orientation with respect to the mating part. The ball 104 and the seat 103 operate as a pair, with limited interchangeability of the seat 103 or the ball 104 size. In disclosed embodiments, a given seat 103 size will be lapped to receive a single size of ball 104, although variations are also within the scope of the disclosure. For example, embodiments may use dual-lapped seats, which may admit up to two different ball sizes. Whenever a seat 103 admits more than one ball 104 size, the larger ball is known as the "standard pattern" and the smaller ball is known as the "alternate pattern". The difference in the diameters of the standard and the alternate pattern balls 104 for a given seat 103 size may be ⅛ of an inch or less. Assuming the ball-race diameter admits the utilizations of both the alternate and the standard pattern ball, the alternate pattern would be chosen according to design parameters when the sand cut of the well fluids is high, as the clearance between the ball 104 and the ball-race 330 will be larger, and as a results the risk of the ball becoming stuck due to the accumulation of solids inside the cylindrical casing is lower.

The diameter of the balls 104 ranges from 0.500 inches to 3.500 inches, or larger, with some sizes specified by industry standards such as those provided by API. Including API and non-API sizes, balls 104 are commonly found to include a diameter ranging from about 0.500 inches to about 3.500 inches. For example, a ball 104 may have the following diameters: about 0.500 inches, about 0.625 inches, about 0.688 inches, about 0.750 inches, about 0.875 inches, about 1.000 inches, about 1.125 inches, about 1.250 inches, about 1.375 inches, about 1.500 inches, about 1.688 inches, about 1.750 inches, about 1875 inches, about 2.000 inches, about 2.125 inches, about 2.250 inches, about 2.375 inches, about 2.500 inches, about 2.750 inches, about 2.875 inches, about 3.00 inches, about 3.125 inches, about 3.250 inches, about 3.375 inches, and about 3.500 inches, where about includes plus or minus 0.063 inches.

Balls 104 and seats 103 may be made of similar materials, with the seat being only slightly harder than the ball. Materials that may be used for balls 104 and seats 103 are cobalt alloys, martensitic stainless steels, and ceramics such as tungsten or chromium carbide. Balls 104 and seats 103 made of different materials can be used together, for example, a tungsten carbide seat may be used together with a matching size chromium carbide ball. Different materials have different densities resulting in lighter or heavier balls 104; lighter balls offering a lower cracking pressure than heavier balls and therefore may be chosen according to design principles herein for applications with low intake pressures. On the other hand, heavier balls 104 may be used for applications with highly viscous fluids, as they are able to close faster.

The cylindrical casing 100 illustrated in FIGS. 3A-3D correspond to a closed-type configuration in which the fluids are ejected from the cylindrical casing through a single round opening located on the top. The opposite configuration is referred to herein as "open-type," and in this configuration the flow-passages 106 connect the interior of the cylindrical casing with the exterior, discharging the flow 313 outside of the cylindrical casing 100 through as many perforations as flow-passages the cylindrical casing may implement. Notwithstanding that the cylindrical casing 100 as presented in FIG. 3A illustrates an embodiment approach for a closed-type standing valve 113, the present disclosure extends to open-type and travelling valve configurations as well.

FIG. 3B illustrates a cross-sectional view of a check valve assembly 327, including a matching size ball 104 and seat 103, and a cylindrical casing 100 according to a specific embodiment of the disclosure. The ball 104 is shown in its uppermost position held against the ball-stop 115, which defines the fully open position of the check valve assembly 327.

Described ball-type check valve assemblies 327 allow fluids 313 to flow only in one pre-specified direction, from bottom to top, while offering a high resistance to the flow in the opposite direction. The fully open position of the check valve assembly 327, enables a fluid connection between the top 102 and the bottom 101 ends of the cylindrical casing 100, allowing for upward-moving well fluids 313 to flow around the ball 104, through the flow-passages 106, and out of the cylindrical casing. The flow-passages 106 in disclosed cylindrical casings 100 comprise a lower section 131 diverging radially from the axis of the cylindrical casing, and an upper section 107 converging back to the axis of the cylindrical casing 100, thereby defining the pathway for the upward-flowing fluids 313 to circumvent the restriction offered by the ball 104.

FIG. 3C illustrates a top view of the cylindrical casing in FIG. 3A, showing three circumferentially-elongated or "bean-like" flow-passages 106 disposed on a bore-circle 125 and symmetrically arranged around the longitudinal axis of the cylindrical casing 100.

Figure 10A:
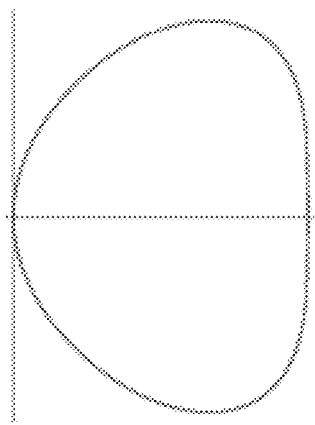
FIG. 10A illustrates a bean curve according to an embodiment of the disclosure.

Without limitation, a "bean-like-shaped" or "bean shaped" passage should be interpreted as a fluid passage having a cross-sectional perimeter that has multiple radiuses with those radiuses having multiple center points. Bean-shaped curves have been mathematically described in Wolffram MathWorld and below, but without limitation such curves shall be construed to include a "quartic curve" as illustrated by the graphs and equations from the Wolfram website cited herein and shown below:

FIG. 10A illustrates a bean curve.

The bean curve identified by Cundy and Rowllet (1969, p. 72) is the quartic curve given by the implicit equation $$x^4+x^2+y^2+y^4=ax(x^2+y^2).$$

It has horizontal tangents at (⅔a, ⅔a) and vertical tangents (0, 0) and (a, 0). The area enclosed by the curve is given by $$A = \sqrt{2}\ a^2 \int_0^1 \sqrt{x(1-x+\sqrt{1+(2-3x)x})}\ dx$$
$$= \frac{7\pi a^2}{12\sqrt{3}}$$
$$= 1.058049 \ldots a^2$$

Figure 10B:
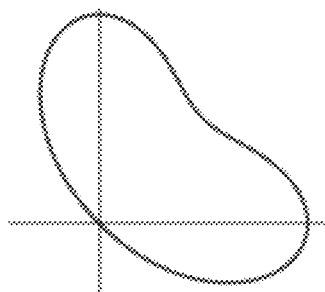
FIG. 10B illustrates a lima bean curve according to an embodiment of the disclosure
Figure 10C:
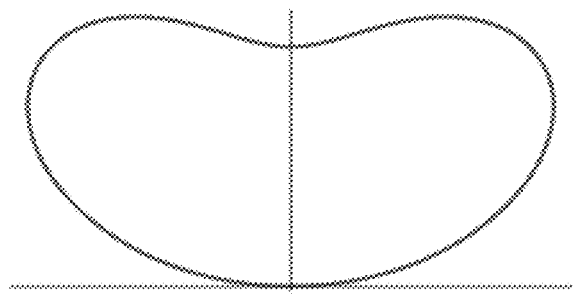
FIG. 10C illustrates a second lima bean curve according to an embodiment of the disclosure.

FIGS. 10B and 10C illustrate lima bean curves.

A second bean curve that more closely resembles an actual bean (in particular, a lima bean), here called the "lima bean curve," is given by the simple polar equation $$r=a(\sin^3\theta+\cos^3\theta)$$

(Wassenaar: left figure above). It also is a quartic curve and has Cartesian equation $$(x^2+y^2)^2=a(x^3+y^3).$$

If the lima bean is rotated so that it appears entirely in the y>0 half-plane and is oriented symmetrically about the x-axis (right figure above), its Cartesian equation becomes √{square root over (2)}(x²+y²)²=ay(3x²+y²).

The parametric equations of the original polar curve are $$x=a\cos t(\sin^3 t+\cos^3 t)$$

$$y=a\sin t(\sin^3 t+\cos^3 t).$$

This curve has maximum values $x_{max}=y_{max}=1$ and minimum values $x_{min}=y_{min}=r$, where r=−0.28288 . . . is the real root of 27−27x−288x²+512x³=0. The area enclosed by the curve is $$A = \frac{8}{18}\pi a^2$$
$$= 0.98174770 \ldots a^2$$

Additionally and again without limitation such curves include substantially non-circular and in some cases non-oval perimeters, such as closed curves having multiple radiuses that appear substantially like one of the above curves but without satisfying the above-described formulas.

The flow-passages 106 offer a pathway for fluids to overcome the restriction offered by the ball 104, and the design optimization process has outlined the inverse correlation between the pressure drop across the cylindrical casing 100 and the diameter of the bore-circle 125 defining the flow-passages 106. The design optimization goal being minimizing the pressure-drop suggests the utilization of a bore-circle 125 as large as it can be possibly accommodated, subject to other design and manufacturability constraints. All factors considered, by design the diameter of the bore-circle 125 defining the flow-passages in disclosed cylindrical casings is equal or nearly equal to that of the ball 104 used, with variations as described herein with regard to the disclosed embodiments.

In addition to the bore-circle diameter 125, bean-like flow-passages are parameterized by a characteristic hole-diameter 126 and an angular spam 124. Both the angular spam 124 and the hole-diameter 126 positively correlate with the resulting flow-area of the flow-passages 106, hence by following the same optimization principle used to define the bore-circle diameter 125, both parameters should be as large as the geometry and the application can possibly accommodate.

The bean-like form of the flow-passages 106 maximizes the flow area without compromising the mechanical integrity of the cylindrical casing. Disclosed cylindrical casings 100 can have two, three, four, or even more flow-passages, subject only to geometrical and manufacturability constraints. Furthermore, a non-symmetrical arrangement of the flow-passages 106 is also possible; such as a cylindrical casing 100 with an arrangement of multiple flow-passages 106 of different hole-sizes 126, and/or bore-circles 125, and/or angular-spams 124.

FIG. 3D illustrates a cross-sectional view of the cylindrical casing 100 in FIG. 3A, with the cut made across the center of the ball 104. FIG. 3D illustrates three guides 105 interspaced with an equal number of flow-passages 106, with the concave faces of the 3 guides 105 defining the diameter of the ball-race 130 and the clearance 123 with the ball 104. In disclosed embodiments, there may be an equal number of guides 105 and flow-passages 106, and both are symmetrically arranged around the axis of the cylindrical casing 100. Disclosed cylindrical casings can, however, have a different number of guides 105 than flow-passages 106, and they may as well be asymmetrically arranged.

In disclosed embodiments, the guides 105 may be made of a cobalt alloy welded inside a pre-existing hemispherical cavity and subsequently machined to the desired ball-race diameter. The post-welding machining of the guides bores the toe of the weld and the base material surrounding it, effectively removing most of the material from the heat-affected zone (HAZ). Furthermore, the welded guides 105 may be fully embedded within the hemispherical cavity, leaving only one face of the guide exposed to the well fluids. The properties of the cobalt alloy used on the guides offer improved abrasion, impact, and corrosion resistance to the guides relative to the properties of the base material of the cylindrical casing 100. The process of improving the mechanical properties on the guides of a check valve assembly (e.g., ball valve) 327 is referred to herein as "hard-lining." Similar to the flow-passages 106, the hemispherical cavities where the hard-lining material will be deposited are parametrized by a bore-circle diameter 132 and a hole-diameter 133. The bore-circle diameter 132 in disclosed cylindrical casings 100 is sized to provide a hard-lining thickness 134 between about 0.060 inches and about 0.125 inches, whereas the hole-diameter 133 is sized to provide a specific guide-width 122, which may range between about 0.250 inches and about 0.500 inches. The bore-circle diameter 132 in disclosed cylindrical casings 100 is sized to provide a hard-lining thickness 134 of about 0.060 inches, or about 0.080 inches, or about 0.100 inches, or about 0.120 inches, or about 0.125 inches, where about includes plus or minus 0.01 inches. In some embodiments, the hole-diameter 133 is sized to provide a specific guide-width 122, which may be about 0.250 inches, or about 0.300 inches, or about 0.400 inches, or about 0.500 inches, where about includes plus or minus 0.050 inches.

The guides 105 define the ball-race 130, with a characteristic diameter and length. The length of the ball-race limits the range of movement of the ball 104 along the axial direction, while the diameter of the ball-race 130 limits the range of the ball 104 movement along the radial direction. The diameter of the ball-race 130 is defined as the diameter of the ball 104 plus a clearance 123. The clearance in the most common embodiment of the present disclosure may range from about 1/32 inches to 1/16 inches, not excluding clearances of less than about 1/32 inches or more than 1/16 inches. In some embodiments, a clearance may be about 1/2 inches, 1/8 inches, or about 1/16 inches, or about 1/32 inches, where about includes plus or minus 1/64 inches. The clearance 123 impacts the ability of a cylindrical casing to operate in the presence of solids, for example, a larger clearance such as 1/16" to 5/32", may be used when pumping solid-laden fluids to reduce the probability of the ball becoming stuck due to the buildup of material between the ball 104 and the ball-race 130. Large clearances 123 may be as well be chosen when pumping viscous fluids to reduce the drag on the ball 104 while falling, thereby increasing the ball's free-fall velocity and thereby shortening the closing time of the valve.

FIG. 4A illustrates a cross-sectional view of a prior art cylindrical casing 40, in a configuration similar to the cylindrical casing subject of the present disclosure as shown in FIG. 3A. In FIG. 4A the ball 44 is shown at the bottommost position resting against the seat 43, which defines the closed (no flow) position of the valve 27.

Prior art cylindrical casings typically have flat ball-stop 45 profiles, or in some instances have small countersink features which are artifacts of the machining process. The machining of the ball-race 42 and the ball-stop 45 of prior art cylindrical casings 40 typically involves a drilling operation, and the geometry of the ball-stop 45 is typically the negative of the geometry of the drill-bit used for machining. The counter-sinked ball-stop 45 characteristic of prior art cylindrical casings 40 has an angle ranging between 110°-160°, which corresponds to the geometry of the tools most commonly available in the market. Other prior art cylindrical casings will display angled (non-flat) ball-stops, with angles in the range of 135° to 140°, which also results from the tip angle of the tool used for machining.

Prior art cylindrical casings 40 typically exhibit a ball-race 42 length-to-ball 44 diameter ratio of 1.0 to 1.2. The ball-race 42 diameter in prior art cylindrical casings 40 is typically sized to provide a clearance with the ball 44 of at least 1/32", to work with either the standard ball 40 size, the alternate ball size, or both.

The flow-passages in prior art cylindrical casings 40 connect the top 48 and the bottom ends 41 of the cylindrical casing 40 allowing fluids to flow through. The flow-passages are a two-fold feature; a top flow passage 46, and a bottom flow passage 47, both converging at the ball-stop 45 surface.

FIG. 4B illustrates a top view of the prior art cylindrical casing 40 of FIG. 4A. Prior art cylindrical casings 40 typically exhibit 3 or 4 cylindrical flow-passages 46 distributed around the cylindrical casing longitudinal axis. The top flow-passages 46 in prior art cylindrical casings are typically accomplished by a drilling operation.

FIG. 4C illustrates a longitudinal cross-sectional view of the ball-race 42 of the prior art cylindrical casing 40 formed by 3 or more symmetrically distributed guides 49.

The bottom flow-passages 47 in prior art cylindrical casings 40 are cylindrical features running parallel to the longitudinal axis of the cylindrical casing 40 and providing a pathway for the fluid to circumambient the restriction offered by the ball 44. The bottom flow-passages 47 are usually accomplished by an undercut milling operation. As it is illustrated in FIG. 4C, the diameter of the bottom flow-passages 47 and the top flow passage 46 do not necessarily match; given they are driven by different manufacturability and geometrical constrains. The mismatch between the bottom 47 and the top 46 flow-passages at the plane where both features merge imposes a turbulent transition for the fluids flowing through the cylindrical casing 40.

FIG. 5A illustrates a cross-sectional view of a check valve assembly 327 in the fully open position, including a matching size ball 104 and seat 103, and a cylindrical casing 100 according to a specific embodiment of the disclosure. The solid arrows traversing the cylindrical casing 100 from bottom 101 to top 102 qualitatively illustrate the flow field 313. As indicated by the arrows, the fluid 313 enters the cylindrical casing from the bottom 101, impinging and circumventing the ball 104 to enter the flow-passages 106, exiting the cylindrical casing from the top end 102. The drag force exerted by the fluid impinging on the ball 104 pushes the ball against the ball-stop 115, into the fully open position.

The flow-passages 106 in disclosed cylindrical casings 100 comprise a lower diverging section 131 and an upper converging section 107 relative to the longitudinal axis of the cylindrical casing, with both sections merging at a transversal plane passing through or near the center of the ball 104 while in the open position. The top section 107 and bottom section 131 of the flow-passages 106 blend smoothly in a generous concave profile tangential to both sections, avoiding sharp edges and abrupt changes in the flow area to minimize the pressure-drop across the cylindrical casing 100.

As the fluids move up and away from the ball 104, and into the upper section of the flow-passages 107, the flow 313 will tend to detach from the surface of the ball 104 causing turbulence and increasing the pressure-drop. FIG. 5A illustrates the angular spam 133 of the contact surface between the ball 104 and the ball-stop 115. Disclosed angular spam 133 may range from about 60° to about 160°, not excluding large or smaller spams. An angular spam 133 may be about 60°, or about 70°, or about 80°, or about 90°, or about 100°, or about 110°, or about 120°, or about 130°, or about 140°, or about 150°, or about 160°, where about includes plus or minus 5°. Numerical simulations have proven larger spams in disclosed cylindrical casings provide a smother flow path for the flow and mitigate the impact of the flow detachment, resulting in lower pressure-drops.

The drag force acting on the ball 104 results primarily from a frictional pressure-drop, as part of the energy of the incoming fluid 313 is dissipated by the restriction offered by the ball 104. The pressure-drop and consequently the drag-force are functions of the flow field 313; which results from the cylindrical casing 100 design and the flowrate though the flow-passages 106.

The flowrate itself depends on many operational and design parameters, and it varies proportionally to the plunger 16 velocity throughout the stroke of the pump. The flow rate is expressed in terms of unit volume per unit time (gallons per minute, barrels per day) and it is often assumed to follow a sinusoidal curve with the peak value happening midway during the stroke. Since standing and traveling valves 27, 14 open and close at opposite times during the stroke, in a standard sucker-rod pumping application the standing valve 27 will experience the peak flowrate midway during the upstroke, while the travelling valve 14 will experience the peak flowrate midway during the downstroke. Note that references to elements 27, 14, 16 in this context refer to those elements in FIGS. 1 and 2 herein to provide context for the application of the disclosed embodiments in a sucker rod pumping system; this approach continues in the paragraph below.

In disclosed embodiments, while the check valve assembly 327 is in operation, the ball 104 would remain most of the time at the fully open or the fully closed position, minimizing the time spent at any intermediate position along the ball-race 130. In the fully open position, the ball engages with the ball-stop 115 forming a contact surface which stabilizes the ball 104 against the turbulence of the impinging flow 313, preventing the ball 104 from rattling. However, while fluids 313 are flowing through the cylindrical casing 100, the ball 104 may not always lift and rest against the ball-stop 115, that is, if the flow rate is not enough to produce sufficient drag to overcome the weight of the ball 104 itself. In such case, the ball 104 will rattle at an unstable intermediate position between the fully open and the fully closed positions, impacting against the guides 105, deteriorating both the ball 104 and the guides 105.

Disclosed cylindrical casings 100 incorporate a number of features aimed at increasing the drag force on the ball 104 while minimizing the pressure-drop across the cylindrical casing, securing the ball 104 at the fully open position even at very low flowrates, and stabilizing the ball 104 and the flow field 313 around it to extend the life of the ball 104 and the cylindrical casing 100.

FIG. 5B illustrates a cross-sectional view of a cylindrical casing 100 according to a specific embodiment of the disclosure, with the ball 104 shown in the topmost position. Solid arrows radially oriented toward the center of ball illustrate the hydrodynamic pressures acting on the ball 104 surface. The length of the arrows qualitatively correlate with the magnitude of the pressure at each specific location. The effective area for the hydrostatic pressure is split in two halves across the center of the ball 104. The top surface area 111 and the bottom surface area 110. The weight of the ball 118 is illustrated with a downward-pointing solid arrow. Furthermore, three relevant areas are defined in FIG. 5B; the projected area of the ball-stop 114, the flow area across the flow-passages 106 right below the center of the ball 112, and the flow area across the flow-passages 106 right above the center of the ball 113. Disclosed cylindrical casings make use of the hydrodynamic pressure differential acting on the ball 104 at the fully open position to help retain and stabilize the ball 104 in that position, further reducing or even eliminating ball 104 rattling.

A net lifting force 120 resulting from the differential hydrodynamic forces acting below and above the ball 104 is accomplished in described cylindrical casings 100 by manipulating the fluid velocity near the ball 104, indirectly inducing a differential hydrodynamic lifting force by extension of the Bernoulli principle. The Bernoulli principle states that fluids experiencing an increase in their velocity due to a reduction in the flow area will undergo a proportional decrease in their local pressure. Bernoulli's principle hence predicts a comparatively lower fluid pressure acting normal to the ball 104 surface on areas where the fluid velocity is comparatively higher, and by extension the other way around. In the context of the described cylindrical casings 100, the ball 104 is effectively a large restriction as it redirects the flow 313 from the entry of the cylindrical casing 100 and into the reduced area offered by the flow-passages 106. The fluid velocity near the bottom of the ball 104 is comparatively small as the impinging fluid experiences an abrupt change in the direction of flow, which results in a comparatively higher pressure acting on the bottom face of the ball 104. On the other hand, the fluid velocity is greatly increased as it moves through the flow-passages 106 near and above the ball 104 center, resulting in a comparatively lower pressure acting on the top side of the ball 104. By manipulating the location and the magnitude of the flow areas 113, 112 in the flow-passages 106 above and below the ball 104 center respectively, it is possible to control the fluid velocity around the ball 104, purposely inducing a hydrodynamic lifting force 120, that is, in addition to the drag-force induced by the frictional pressure-drop as previously described in FIG. 5A. The area of the flow passage above the center of the ball 111 is by design smaller than the area of the flow passage below the center of the ball 112, with the intention to accelerate the fluid to generate a lower pressure on the upper section of the ball 111.

In addition to the induced hydrodynamic pressure differential, the net hydrodynamic lifting force 120 is further increased by manipulating the effective areas 110, 111 where the differential pressures act. FIG. 5B illustrate the relative magnitude of the effective surface areas below 110 and above 111 the ball 104. The top effective area 111 excludes the projected area of the ball-stop 114, which results in the top area 111 being much smaller than the bottom one 110. The reduced top effective area is conditional upon the ball-stop 115 having the same or nearly the same diameter as the ball 104, which is claimed in the present disclosure.

Figure 6A:
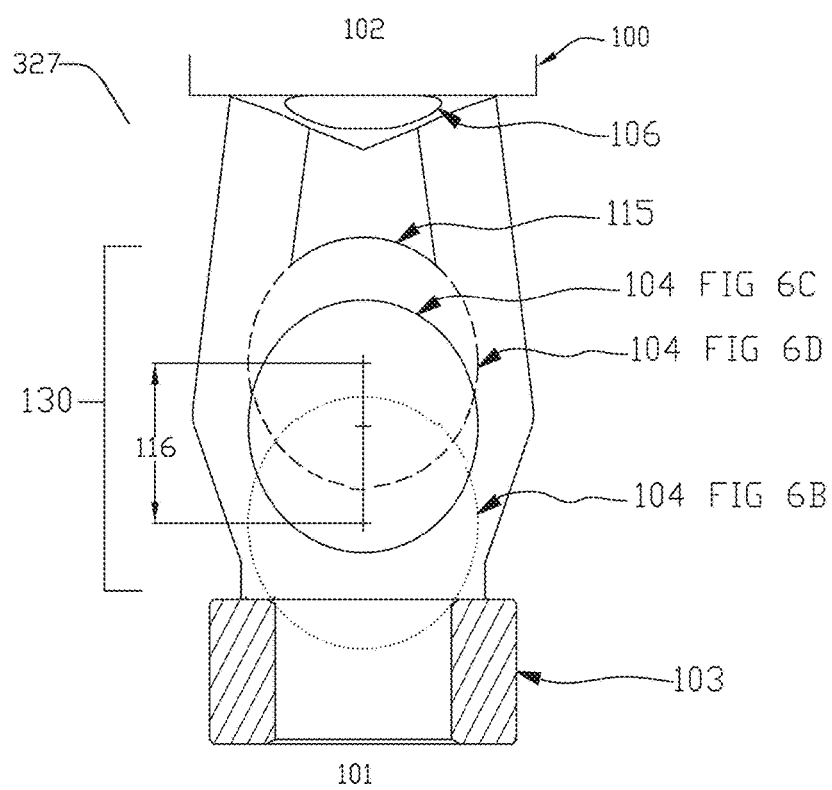
FIG. 6A illustrates a longitudinal cross-sectional view of a valve with the ball in three different positions, according to an example embodiment of the disclosure.

FIG. 6A illustrates a cross-section view of a cylindrical casing 100 according to a specific embodiment of the disclosure, depicting the ball 104 in 3 different positions along the ball-race 130. The bottommost ball 104 position defines the closed position of the check valve assembly 327, the topmost position of the ball 104 defines the fully open position of the check valve assembly 327, and the middle ball 104 position defines a partial opening position of the check valve assembly 327. The ball-race length 116 is hereby defined as the maximum possible distance traveled by the center of the ball 104 along the longitudinal axis of the cylindrical casing 100, expressed relative to the diameter of the ball 104. The ball-race length 116 is visually defined in FIG. 6A as the distance between the ball centers at the topmost and the bottommost positions of the ball 104. The ball-race length 116 is defined as a ratio for the purpose of standardization, given the numerous cylindrical casing 100 sizes and ball 104 sizes combinations possible. Disclosed cylindrical casings in certain embodiments have a ball-race length 116 ranging from about 0.50 to about 0.75 times the diameter of the ball 104, comparatively shorter than prior art cylindrical casings 40. In some embodiments, a disclosed cylindrical casing may have a ball-race 116 length ranging from about 0.50, or about 0.55, or about 0.60, or about 0.65, or about 0.70, or about 0.75 times the diameter of the ball 104, where about includes plus or minus 0.25. The performance of a cylindrical casing may be assessed in terms of 1) durability, 2) pressure-drop, and 3) speed of actuation, and all the three may be directly or indirectly linked to the length of the ball-race 116.

The durability of the sealing surfaces on the ball 104 and on the seat 103 are instrumental for sustaining the volumetric efficiency of the pump over time. The sealing surface on the ball 104 wears out over time due to the repeated pounding against the ball-stop 115 and the seat 103 during the opening and closing strokes of the valve. The kinetic energy dissipated when the ball 104 hits the ball-stop 115 or the seat 103 is proportional to the terminal velocity of the ball 104, which in turn is proportional to the length of the ball-race 116. Equation 1 shows the theoretical relation between the terminal kinetic energy and the ball-race length 116 during the opening or the closing of the check valve assembly 327. Equation 1 demonstrate that a comparatively shorter ball-race length is favorable to the durability of the cylindrical casing as it reduces the kinetic energy of the ball 104 upon impact.

$$KE_{TERMINAL} = m_{ball} * a_{ball} * ballrace_{length} \qquad \text{Equation 1:}$$

$m_{ball}$=mass of the ball
$a_{ball}$=acceleration of the ball

The pressure-drop experienced by the well fluids flowing through the pump components is highly sensitive to the geometry of each component, and such geometry for the purpose of estimating pressure losses can be described in terms of a transversal open-area for flow and a longitudinal distance 116. The pressure drop across a given feature is proportional to the length of the feature, and inversely proportional to the open area for flow, therefore an increase in the flow area or a reduction in the length of the feature will both result in comparatively lower pressure drops across the component. In that vein, with other conditions being the same, reducing the length of the ball-race 116 yields a lower pressure-drop across the cylindrical casing 100. Computational-fluid-dynamics (CFD) simulations and laboratory data support this claim.

The speed of actuation in the travelling and the standing check valve assemblies 327 can significantly influence the volumetric efficiency of a sucker-rod pump 6, given the valves operate synchronously. For example, an undesirable yet common scenario in which the standing valve closing is delayed, which allows fluids already in the compression chamber 21 to flow back out of the pump 6 as the volume of the compression chamber shrinks during the downstroke. Similarly, if under any circumstances both valves happen to be open at the same time, a connection between the high-pressure outlet 23 and the low-pressure inlet 22 will be temporarily established causing a reverse flow. Hence, the speed of actuation of the check vale assemblies 327 greatly influences the overall performance of the pump 6.

In general terms, valves in sucker-rod pumps 6 1) first open as a result of a hydrostatic pressure differential, 2) remain open due to the drag force exerted by the flow impinging on the ball, 3) close due to the weight of the ball once the flow ceases, and 4) remain closed creating a fluid seal once a hydrostatic pressure differential is established. Assuming all the factors that may impact the speed of actuation of the valve in steps 1 through 4 are kept constant, the time that will take the valve to switch from the fully-closed to the fully-open position, or the other way around, is directly proportional to the distance travelled 116 by the ball 104 when moving between said positions. Hence, the actuation time of the check valve assembly 327 can be reduced if the length 116 of the ball-race is reduced, which will positively impact the volumetric efficiency of the pump 6.

Figure 6D:
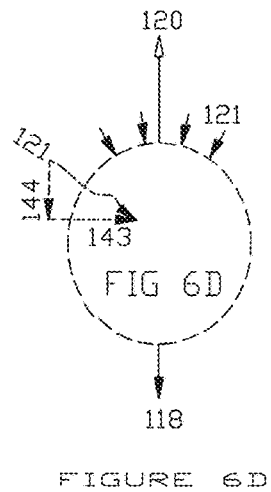
FIGS. 6B-6D illustrate free-body diagrams for the three ball positions defined in FIG. 6A, according to an example embodiment of the disclosure.
Figure 6C:
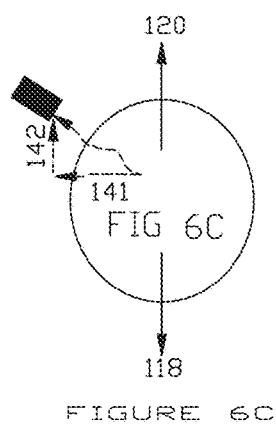
Figure 6B:
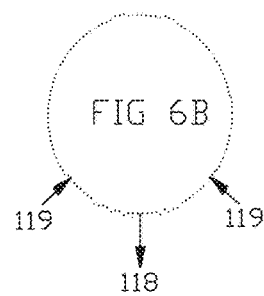

FIGS. 6B, 6C & 6D illustrate the free-body-diagrams for the three ball positions shown in FIG. 6A.

In the bottommost position (FIG. 6B), the ball 104 is resting against the seat 103 defining the closed position of the check valve assembly 327. The seat 103 exerts a distributed force 119 on the ball 104, in a direction normal to the circumferential contact face between the two. The ball weight 118 is illustrated pointing downwards, in the same direction as the gravity acceleration. The effective area for the hydrostatic pressure on the top side of the ball is the projected area resulting from the ball 104 diameter, whereas the hydrostatic pressure acting on the bottom side of the ball 104 is effective on the area delimited by the internal diameter (ID) of the seat 103. Jointly, the differential areas above and below the ball along with the weight of the ball 118 itself define the cracking pressure of the check valve assembly 327. The closed position is considered a stable position for the ball 104, as all the vector forces acting on the ball are balanced and radially directed through its center.

In the topmost position (FIG. 6D), the ball 104 is kept against the ball-stop 115 by the net longitudinal component of the drag force 120 exerted by the flow, defining the fully open position of the check valve assembly 327. In this position, the drag force 120 is mathematically equal to the weight 118 of the ball plus the resultant normal force 121 exerted by the ball-stop 115.

The drag force 120 resulting from the flow varies in time proportional to the flowrate, but in a shorter time scale it is subject to the turbulence of the flow, as well as the potential perturbations to the flow-field originated by external factors. The variations in the flow causing abrupt changes in the drag force 120 result in rapid and chaotic ball 104 movements, often described as rattling. The net drag force at a stable flow condition is illustrated by an upward-pointing solid arrow. The net drag forces for an arbitrarily chosen perturbed flow conditions is illustrated by a curved dashed arrow 140.

The drag force can be decomposed into a net longitudinal-acting 142 component parallel to the direction of the flow, and a net transversal-acting 141 component perpendicular to the direction of the flow, with the transversal component 141 cancelling out only in a stable flow regime.

The ball-stop 115 may have a concave geometry with a diameter equal (or very close) to the diameter of the ball 104 exerts a distributed force 121 radially oriented towards the center of the ball 104. Said distributed force can as well be decomposed into a net longitudinal-acting component 144 parallel to the direction of the flow, and a net transversal-acting component 143 perpendicular to the direction of the flow. Even though the net transversal-acting component 143 may cancel out under stable flow conditions, the concave shape of the ball-stop may exert a net non-zero transversal force 143 on the ball 104 in the presence of a net non-zero transversal drag force component 141. The concave ball-stop 115 profile counteracts the perturbations to the drag force 140 that would otherwise lead the ball 104 to rattle at the topmost position. The topmost position is hence a stable position for the ball 104 due to the stabilizing action of the disclosed concave ball-stop profile 115.

At the middle position (FIG. 6C), the ball 104 is suspended at an intermediate point along the ball-race 130 resulting from the equilibrium of forces between the flow drag 120 and the weight of the ball 118. The length of the arrows in the free body diagram qualitatively illustrates the magnitude of the forces. The middle position is an unstable position for the ball 104 given the lack of lateral support, which makes the ball susceptible to rattle in the presence of flow perturbations. The disclosed embodiments, by limiting the time the ball spends at any intermediate location along the ball-race, diminishes the amount of such damaging rattle.

FIGS. 7A TO 7D illustrate cross-sectional views of multiple configurations of the ball-race 130 according to specific embodiments of the disclosure.

In addition to the ball 104 and the seat 103, FIG. 7A-7D illustrate relevant features of the ball-race 130 geometry, such as the ball-stop 115, the guides 105 and the ball-race clearance. The guides 105 in the illustrated embodiments extend from a location near the bottom sealing surface of the cylindrical casing 126, to a location near or passed the beginning of the concave profile of the ball-stop 115, providing an uninterrupted profile throughout the length of the ball-race 130. The definitions of the ball-race length 116 and the ball-race diameter provided earlier in the discloser remain effective on these embodiments.

Figure 7A:
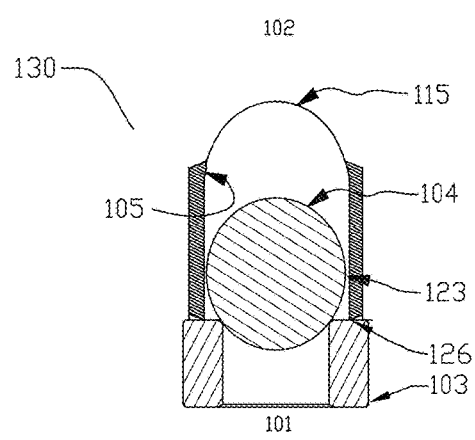
FIGS. 7A-7D illustrate multiple longitudinal cross-sectional views of the ball-race, exhibiting different embodiments.
Figure 7C:
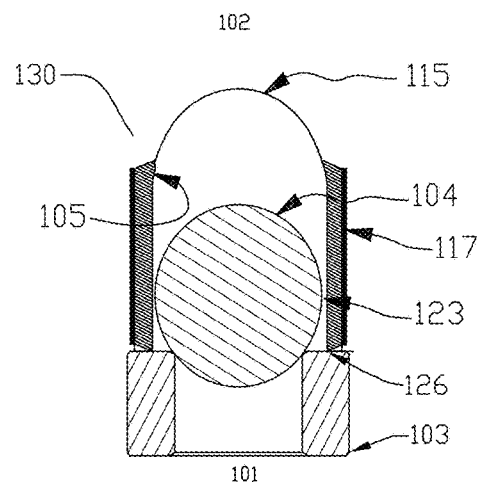
Figure 7B:
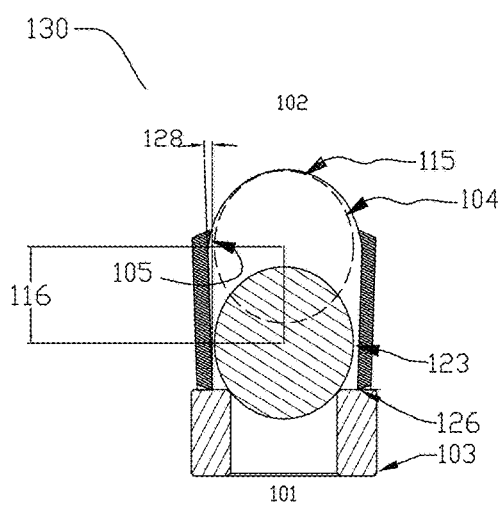

The guides 105 as depicted in FIG. 7A-7B may be formed with the same material as the base metal used for the cylindrical casing 100, or may be accomplished by a hard-lining process for the purpose of locally improving the mechanical properties of the feature.

Hard-lined guides 105 may comprise different materials, including but not limited to cobalt-based, chrome-based, and/or nickel-based alloys. Similarly, disclosed hard-lined guides may comprise different application processes such as TIG welding and MIG welding, but also electroplating, electroless plating, CVD, PVD, electroforming, in-situ casting, 3D printing, laser-surface hardening, among others.

FIG. 7A illustrate a specific embodiment of the disclosure in which the ball-race diameter resulting from the shape of the guides 105 is constant throughout the entire ball-race length 116.

FIG. 7B illustrate a specific embodiment of the disclosure in which the ball-race diameter resulting from the shape of the guides 105 is larger near the ball-stop 115 than it is near the seat 103, with such configuration herby defined as a "tapered out" ball-race. An alternate configuration of the ball-race 130 may comprise guides 105 shaped to provide a larger ball-race diameter near the seat 103 than near the ball-stop 115, with such configuration herby defined as a "tapered in" ball-race. Between the top and the bottom ends of the ball-race 130, the guides may follow a linear profile forming a taper angle with the cylindrical casing longitudinal axis, or, alternatively, the guides may form a concave, a convex, or a custom spline profile. Specific ball-race 130 profiles are aimed at improving the gas and sand-handling ability of disclosed cylindrical casings. For example, in some deviated or horizontal-well applications, the closing of the check valve assembly 327 is delayed because the pump orientation diminishes the magnitude of the gravity acceleration favoring the alignment of the ball 104 with the seat 103, and as a result the ball 104 may drop and rest against the guides 105 of the cylindrical casing 100, but it may not create a seal with the seat 103. In such cases, a tapered-in ball-race configuration may facilitate the closing of the check valve assembly 327 as the ball 104 will be guided closer to the seat 103 axis, and a fluid seal will be accomplished sooner. On the other hand, some application where the ball 104 experiences a delay during the opening may benefit from implementing a taper out configuration that will allow a larger clearance with the guides 105.

Figure 7D:
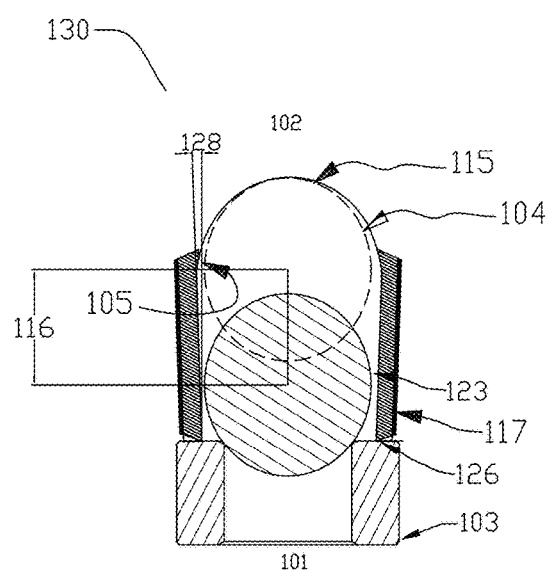

FIG. 7C-7D illustrate a different fabrication method for the guides 105, yet leading to a similar final embodiment as described in figures FIG. 7A-7B. The guides 105 as depicted in FIG. 7C-7D may be fabricated by pre-formed inserts permanently affixed to the cylindrical casing 100 by a non-reversible welding, soldering, or brazing operation, with or without a filler material 117. Alternatively, industrial adhesives 117 may as well be employed in cases where the guide 105 material cannot withstand the high temperatures imposed by the aforementioned methods. The pre-formed guides 105 provide more flexibility for the selection of the guide material than a hard-lining operation, and virtually any material can be used subject only to the requirements of the affixing process used. Disclosed guides 105 may be made of stainless steels such as 431, 422, or 17-4, or may use different cobalt alloys such as Stellite. Alternatively, "soft-lined" cylindrical casings may employ polymers to increase the toughness of the guides 105 in application where the ball 104 rattle cannot be controlled, and the constant pounding of the ball 104 against the guides 105 will cause the rapid degradation of hard materials.

FIG. 7C illustrates an embodiment similar to that of FIG. 7A, comprising the above-described insert-type guides and a straight ball-race profile.

FIG. 7D illustrates an embodiment similar to that of FIG. 7B, comprising the above-described insert-type guides and a tapered-out ball-race profile.

Figure 8B:
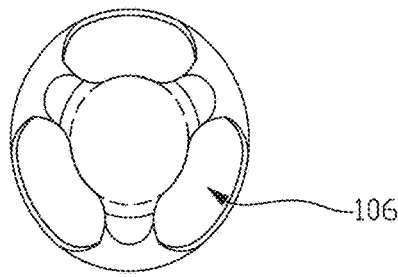
FIG. 8B illustrates a top view of the cylindrical casing in FIG. 8A, depicting the characteristic circumferentially elongated flow-passages, according to an example embodiment of the disclosure.
Figure 8A:
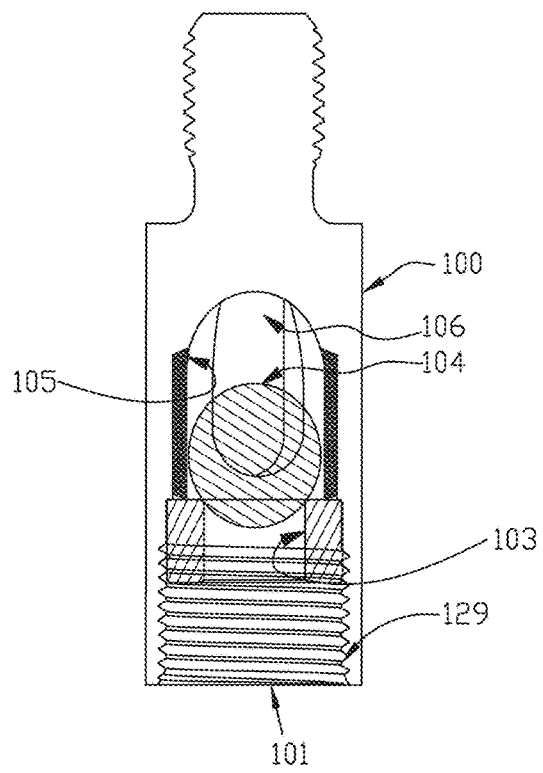
FIG. 8A illustrates a longitudinal cross-sectional view of an alternate embodiment in an open-type configuration, comprising a top externally threaded connection, according to an example embodiment of the disclosure.
Figure 8C:
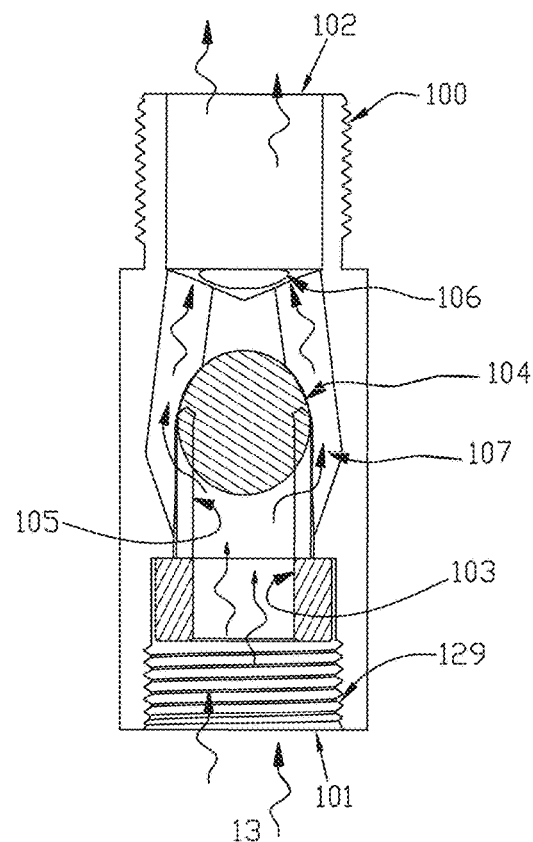
FIG. 8C illustrates a longitudinal cross-sectional view of an alternate embodiment in a closed-type configuration, comprising a top internally threaded connection, according to an example embodiment of the disclosure.

FIGS. 8A AND 8B illustrate cross-sectional views of the front and top sides of an externally threaded open-style cylindrical casing, while FIG. 8C illustrates the front view of an externally threaded closed-type cylindrical casing. The cylindrical casings of FIGS. 8A-8C are examples of analogue realizations of some embodiments as described in the present disclosure. The cylindrical casings of FIGS. 8A-8C incorporate similar configurations of the ball-race 130, the ball-stop 115, the guides 105, and the bean-shaped flow-passages 106 as described in FIG. 3 to FIG. 7.

Figure 9A:
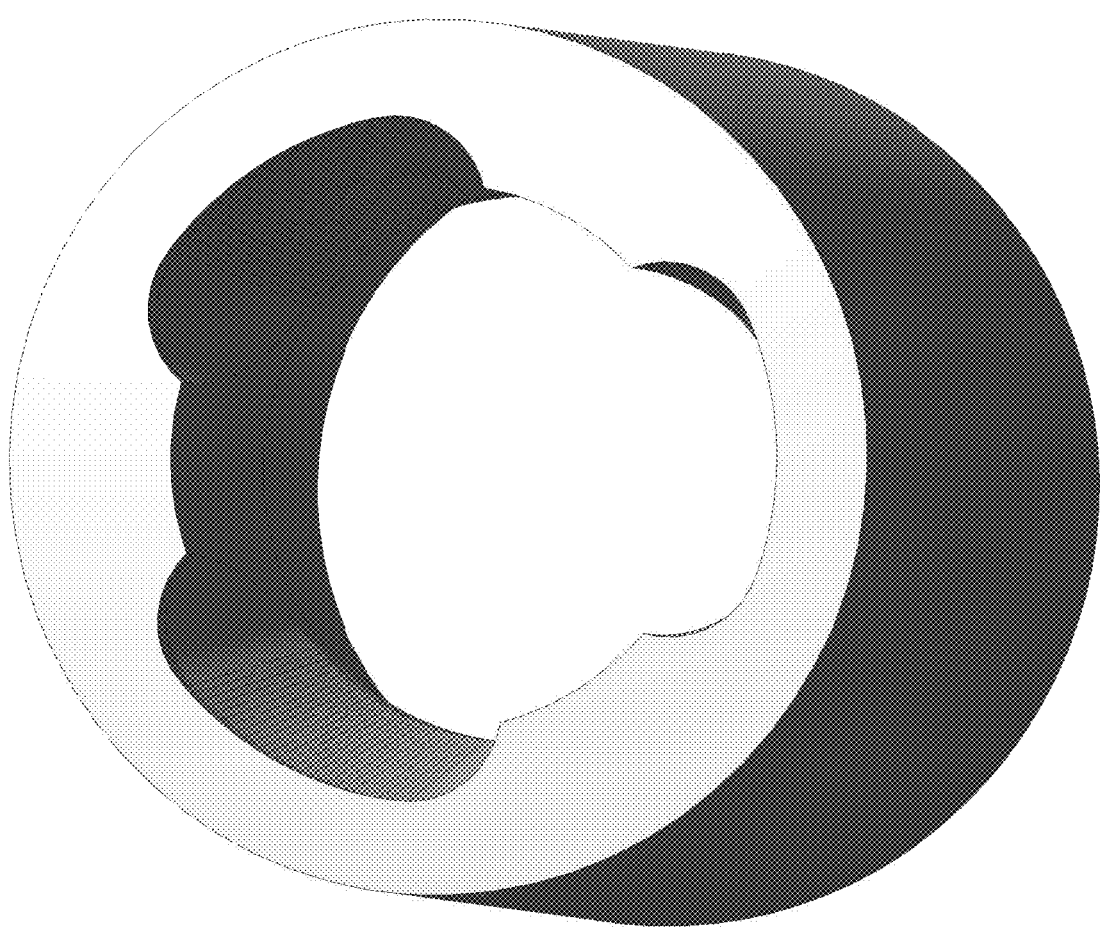
FIG. 9A illustrates a partial sectional perspective view of a ball-race profile, according to an example embodiment of the disclosure.
Figure 9B:
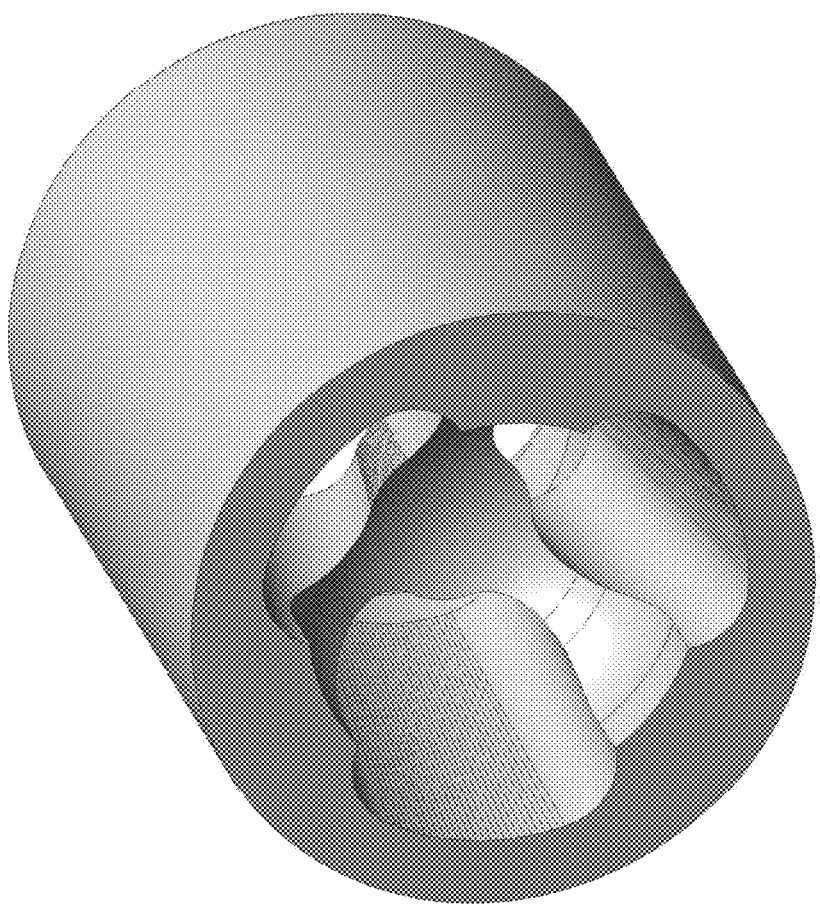
FIG. 9B illustrates a partial sectional perspective view of the ball-race of FIG. 9A, according to an example embodiment of the disclosure.
Figure 9C:
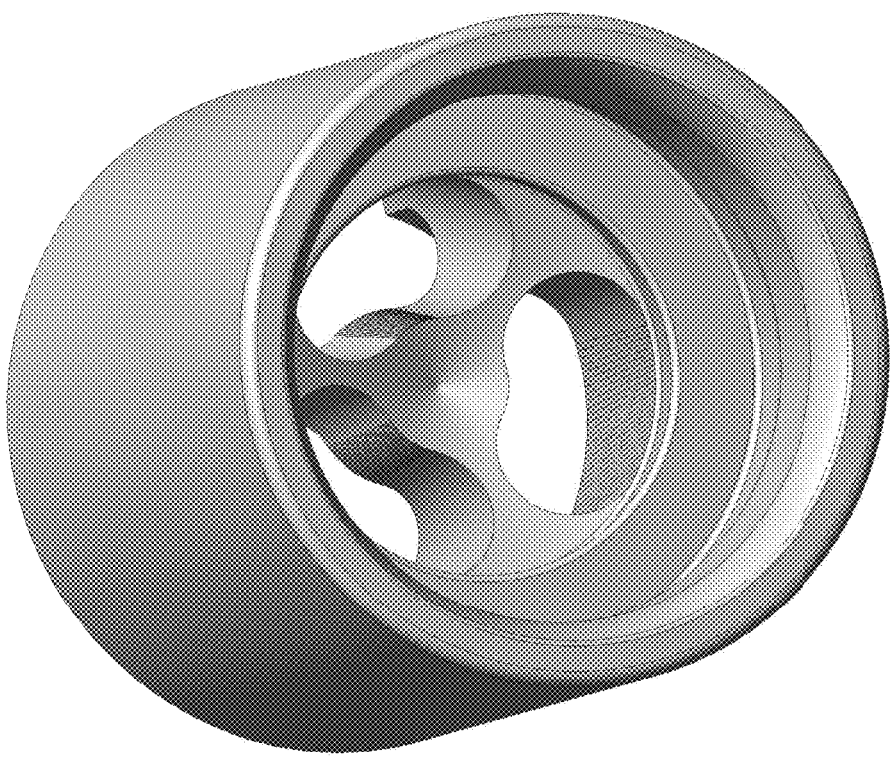
FIG. 9C illustrates a partial sectional perspective view of the ball-race of FIG. 9A, according to an example embodiment of the disclosure.
Figure 9D:
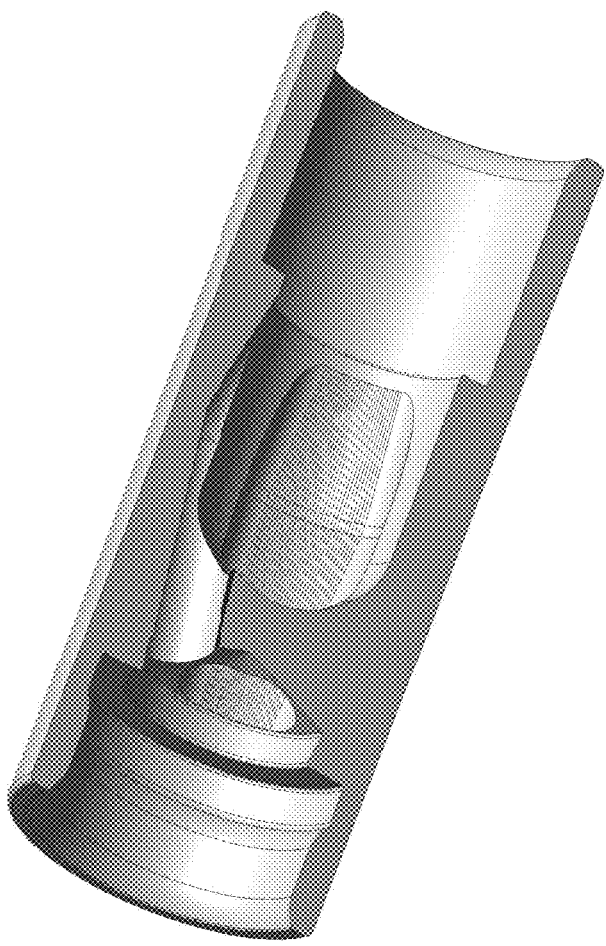
FIG. 9D illustrates a partial sectional perspective view of the ball-race of FIG. 9A, according to an example embodiment of the disclosure.
Figure 9E:
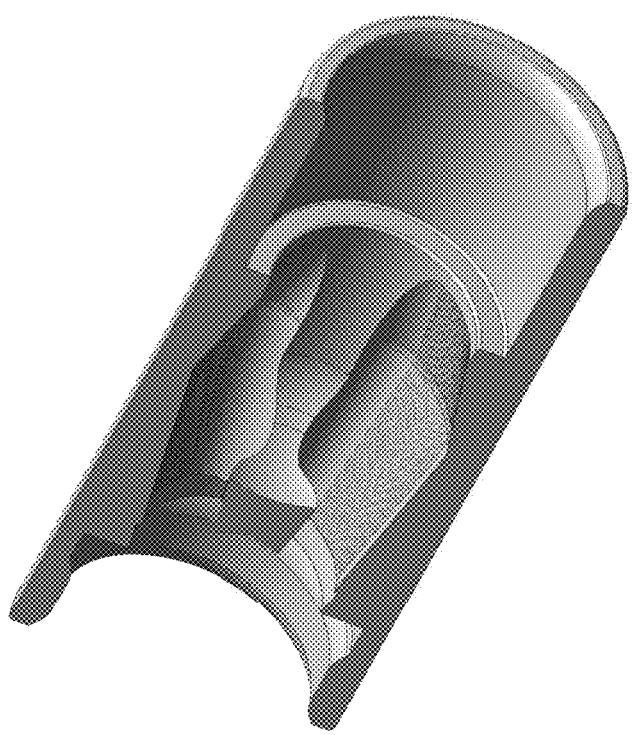
FIG. 9E illustrates a cutaway profile view of the ball-race of FIG. 9A, according to an example embodiment of the disclosure.

FIGS. 9A 9B, 9C, and 9D illustrate partial sectional perspective views of current embodiment ball-race profiles. FIG. 9A is a partial sectional perspective view of a bottom portion of a disclosed embodiment ball-race profile illustrating portions of the flow-passages along with other elements. FIG. 9B is a partial sectional perspective view of a top portion of a disclosed embodiment ball-race profile illustrating the continuing top portion of a disclosed embodiment ball-profile that was illustrated in FIG. 9A. FIG. 9C is a partial sectional perspective view from the other side of the illustrated portion of FIG. 9B. FIG. 9D is a cut-away illustration of a disclosed embodiment ball-race profile illustrating the entire length of the ball-race profile and the length of an exemplary flow passage. FIG. 9E is a cut-away illustration of the disclosed embodiment profile of FIG. 9D, illustrating converging and diverging portions of flow-passages though it.

Figure 11:
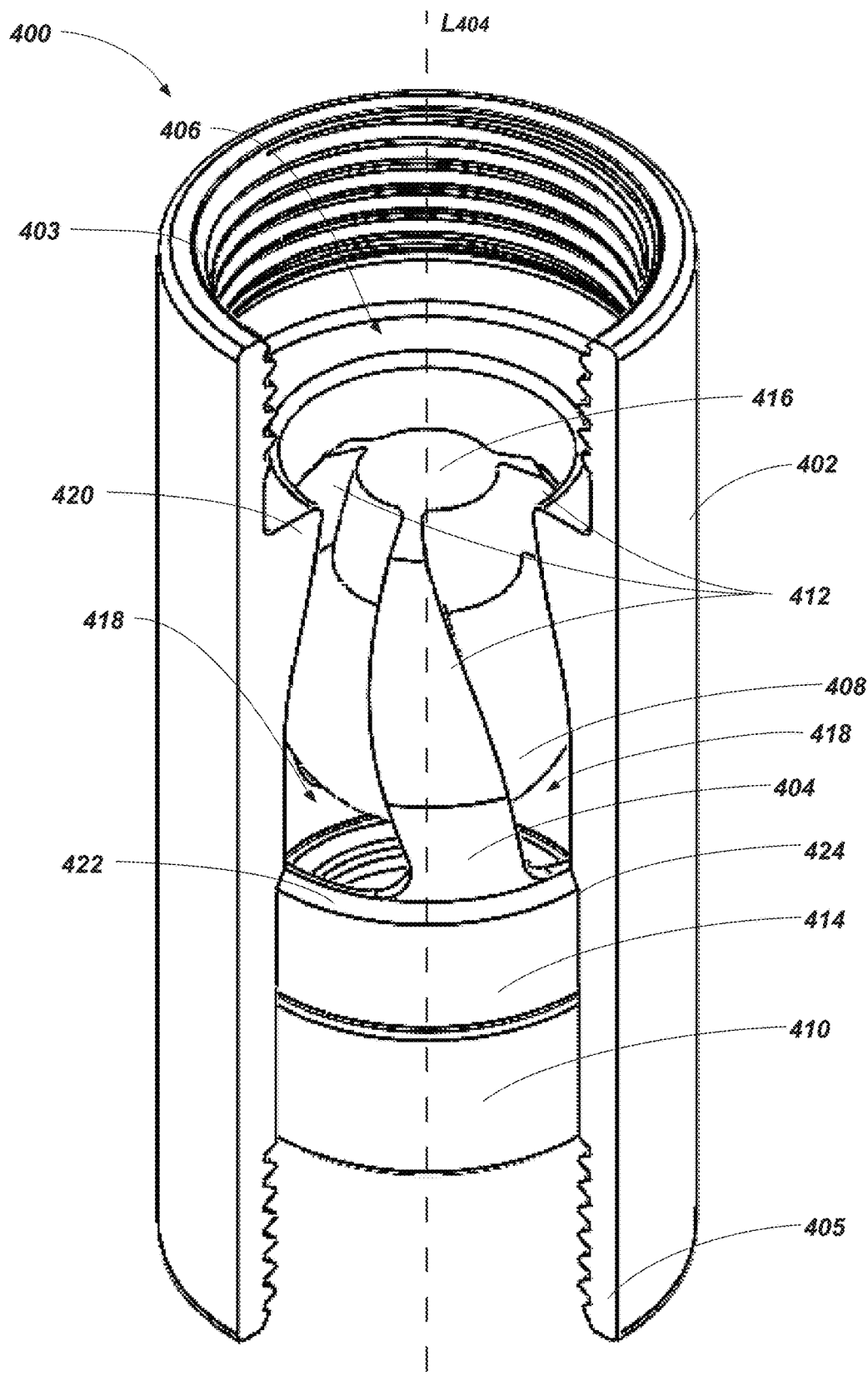
FIG. 11 illustrates a cutaway profile view of a cylindrical casing according to an example embodiment of the disclosure.

FIG. 11 illustrates a cutaway profile view of a valve assembly 400 having a casing 402 (e.g., shell, housing, etc.) for use with a pump as discussed herein. As shown in FIG. 11, the valve assembly 400 may include the casing 402 (e.g., formed as a substantially cylindrical casing) having an insert 404 disposed within an internal flow path 406 of the casing 402. In some embodiments, the insert 404 may be coupled or affixed to the casing 402 in a substantially inseparable manner. For example, the insert 404 may be fixedly coupled to the casing 402 with an interference fit (e.g., a press fit) where the insert 404 is not readily removable from the casing 402 absent a situation where relatively large amount of force or deformation is applied to the casing 402. In some embodiments, the interference fit may provide fluid sealing between the casing 402 and the insert 404. For example, under normal operating conditions, the casing 402 and the insert 404 would function as a monolithic structure with the insert 404 not being removable from the casing 402 absent causing deformation, damage, or destruction to the casing 402 and/or insert 404 (e.g., a destructive force, a force causing plastic deformation).

Figure 14:
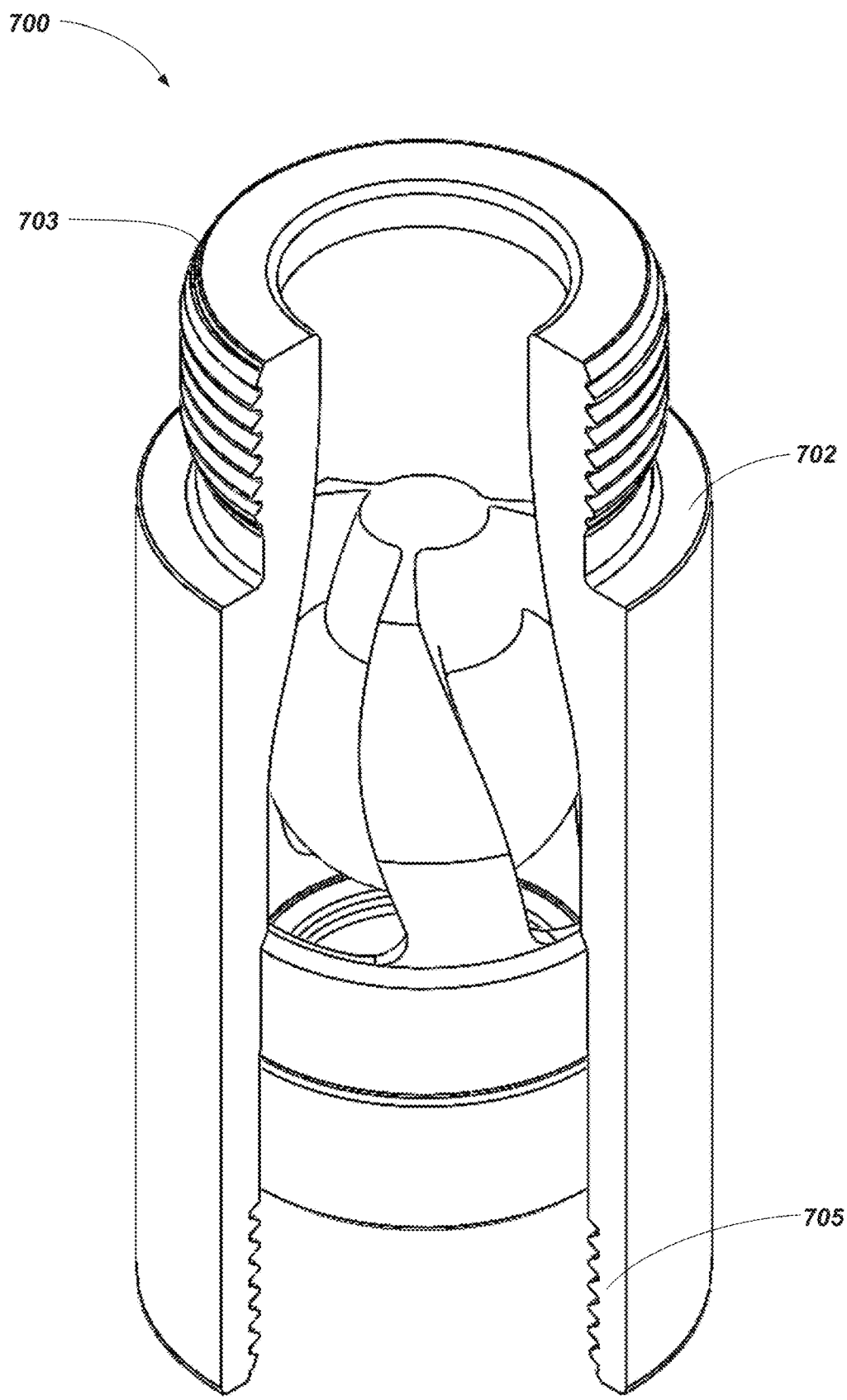
FIG. 14 illustrates a cutaway profile view of a cylindrical casing according to an example embodiment of the disclosure.

The casing 402 of the valve assembly 400 may connect to other fluid-handling components (e.g., components of the pumps disclosed above) by one or more connections (e.g., a first axial or uphole connection 403 and a second axial or downhole connection 405). For example, the axial connections 403, 405 may be internal and/or external threaded connections such as those discussed above. For example, as depicted in FIG. 11, the axial connections 403, 405 may both be internal threaded connections. FIG. 14 depicts another embodiment of a valve assembly 700 including a casing 702 having connections 703, 705. As shown in FIG. 14, one connection 703 may be an external threaded connection while connection 705 is an internal threaded connection.

Referring back to FIG. 11, the insert 404 may define a cage for a restriction element 408 (e.g., a ball) where the restriction element 408 may travel within and relative to the casing 402 and the insert 404. The restriction element 408 may travel within the insert 404 substantially in an axial direction along longitudinal axis $L_{404}$ to selectively alter fluid flow through the insert 404 by enabling free fluid flow in an open position and at least partially occluding fluid flow in a (e.g., occluding a majority of the fluid flow, substantially prohibiting fluid flow, entirely prohibiting fluid flow, etc.) in a closed position.

For example, in a closed position, the restriction element 408 may engage with a seat 410 to restrict fluid along the internal flow path 406 through the insert 404 and the casing 402. While the seat 410 is shown in FIG. 11 as being a separate structure, in additional embodiments, the seat 410 may be integral with the insert 404. In some embodiments, the seat 410 may be coupled or affixed to the casing 402 in a substantially inseparable manner similar to the insert 404 as discussed above.

In an open position, and as depicted in FIG. 11, the restriction element 408 may travel axially away from the seat 410 along protrusions 412 of the insert 404. The protrusions 412 may extend axially away from a base or proximal portion of the insert 404 (e.g., base ring 414) to define guide along which the restriction element 408 may travel in the axial direction (e.g., along longitudinal axis $L_{404}$). The protrusions 412 may converge at a distal or opposite end of the insert 404 (e.g., apex 416) to define an open basket or cage in which the restriction element 408 is received in the open position (e.g., a fully open position). As depicted, the apex 416 may be a partially conical structure (e.g., frustoconical) where the protrusions 412 taper inward (e.g., in a radial direction transverse to the longitudinal axis $L_{404}$) to meet where the apex 416 ends at a substantial point. The apex 416 may include a concave surface configured to engage a surface of the restriction element 408.

Extending between the ring 414 and the apex 416, the protrusions 412 may define openings 418 between each adjacent protrusion 412 in order to define a portion of the internal flow path 406 that extends through the insert 404 when the restriction element 408 is in the open position. As depicted, each of the protrusions 412 may extend individually between the ring 414 and the apex 416. For example, each of the protrusions 412 may extend without being otherwise connected to any of the other protrusions 412 or any other structure except at the base ring 414 and at the apex 416.

In some embodiments, the protrusions 412 may extend in a spiral, generally spiral, or partially helical pattern. For example, the protrusions 412 may partially curve along or about a circumference if the insert 404 such that, as the protrusions 412 extend between the ring 414 and the apex 416, the protrusions 412 do not extend directly straight along the longitudinal axis $L_{404}$. Rather, the protrusions 412 are partially curved in a lateral direction as the protrusions 412 extend to the apex 416 of the insert 404. The curved or twisted the protrusions 412 may act to impart a spiral or twisted flow to the fluid extending through the insert 404. The spiral or twisted flow path may then enable the fluid to separate to travel through the openings 418 and then again converge at the apex 416 while minimizing friction in the flow (e.g., decreasing fluid turbulence). Such flow may assist in providing a desirable amount of pressure drop (e.g., reducing flow restriction and pressure drop) in the flow traveling through the insert 404 when the restriction element 408 is in the open position.

In some embodiments, and as shown in FIG. 11, the protrusions 412 may taper as the protrusions 412 extend away from the ring 414 (e.g., a lateral width or thickness of the protrusions 412 may gradually reduce).

In some embodiments, the casing 402 may include a reduced diameter section 420 that defines an inner aperture for fluid flow that is substantially similar to an inner aperture defined by the ring 414 and/or the seat 410.

In some embodiments, the ring 414 may include a tapered surface 422 that engages with a complementary surface 424 of the casing 402 to minimize disruption of the flow at the interface between the insert 404 and the casing 402.

The casing 402 (e.g., shell) may define an outer cage body that receives the insert 404. The casing 402 may be made from corrosive resistant material and the insert 404 may be made from a relatively more highly corrosive resistant and tougher material that the casing 402 to withstand impact of the restriction element 408 with the insert 404 during use (e.g., such as those material discussed above).

In some embodiments, and as discussed above, the casing 402 and the insert 404 may be manufactured (e.g., machined) with relatively tight tolerances in order to form an inseparable single-piece valve assembly 400 by pressing the insert 404 against the casing 402 with an interference fit. In such embodiments, since the casing 402 and the insert 404 are assembled with a relatively tight interference fit, the valve assembly 400 essentially comprises an inseparable single piece assembly that may only be separated by destructive methods. In some embodiments, the casing 402 and the insert 404 may seal together in the inference fit region (e.g., with the tapered surface 422 of the insert 404) to ensure positive metal to metal seal for a substantially inseparable single piece insert.

The insert 404 including the protrusions 412 (e.g., two to five ribs, or more) converging and intersecting at a cone center defines an overall substantially conical insert 404. The protrusions 412 may be substantially straight or curved (e.g., non-uniform rational b-splines (NURBS) curves) to define a fluid flow path, as discussed below. In some embodiments, the curved protrusions 412 may be selected for use with medium solid fluid without solid separation or accumulation near the check valves.

Figure 12:
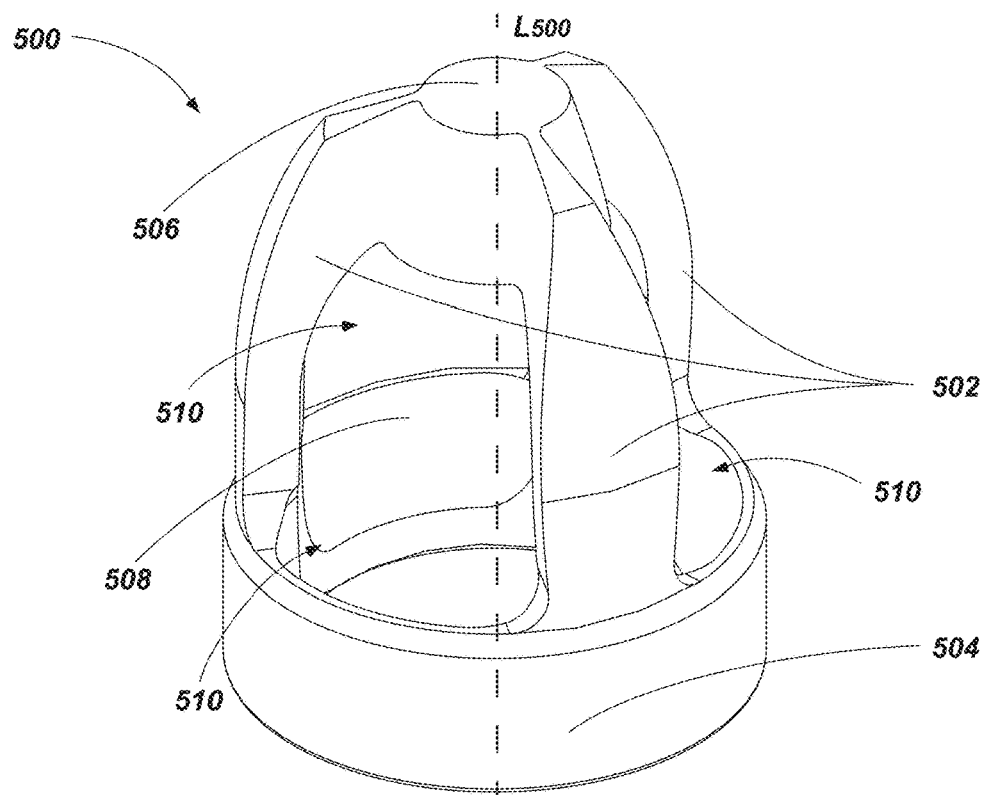
FIG. 12 illustrates a perspective view of an insert for a cylindrical casing according to an example embodiment of the disclosure.

FIG. 12 illustrates a perspective view of an insert 500 for a generally cylindrical casing such as those discussed above. As shown in FIG. 12, the insert 500 may include protrusions 502 extending between a base ring 504 and an apex 506. While the protrusions 502 may exhibit a tapered shape, the protrusions 502 may not curve in a manner similar to the protrusions 412 discussed above. Rather, the protrusions 502 may extend directly (e.g., in a substantially straight line along longitudinal axis $L_{500}$) from the base ring 504 to the apex 506. In some embodiments, the straight protrusions 502 may be selected for use with low solid production fluid.

As best shown in FIG. 12, in some embodiments, the insert 500 (e.g., or other inserts discussed herein) may include one of more cutout portions on an interior surface of the insert 500 (e.g., on an inner surface of the base ring 504). For example, the base ring 504 may include scallop cutouts 508 leading into openings 510 defined between the protrusions 502. Such scallop cutouts 508 leading into the openings 510 may provide a relatively larger volume for fluid flow when the insert 500 is in an open position.

Figure 13:
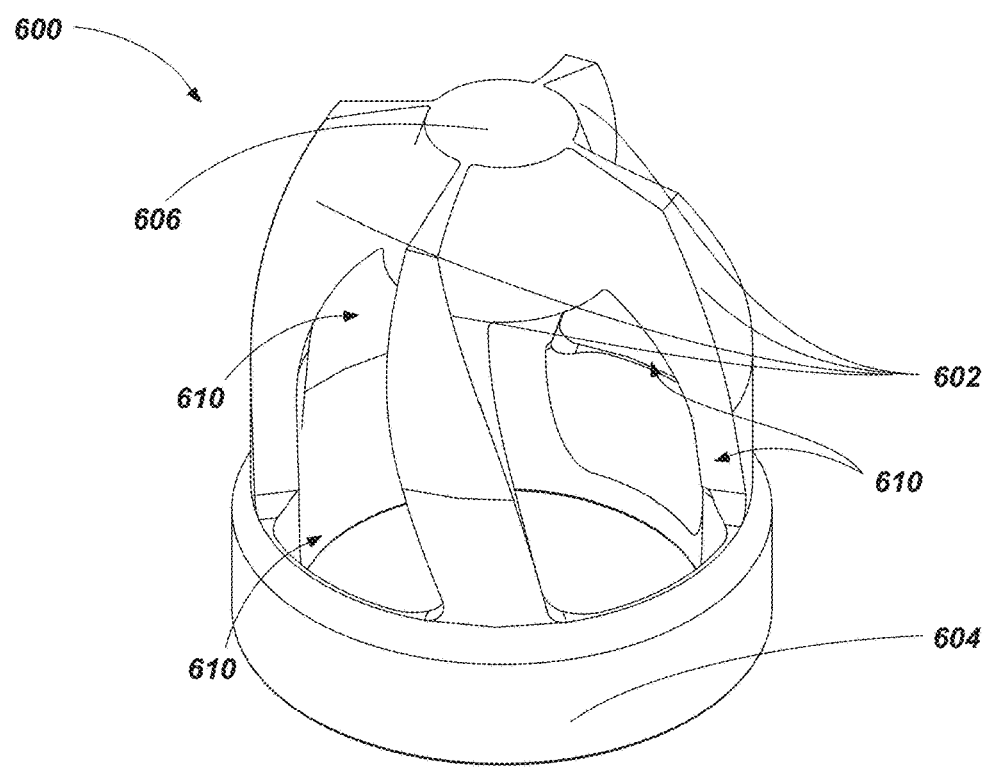
FIG. 13 illustrates a perspective view of an insert for a cylindrical casing according to an example embodiment of the disclosure.

FIG. 13 illustrates a perspective view of an insert 600 for a generally cylindrical casing such as those discussed above. As shown in FIG. 13, the insert 600 may include protrusions 602 (e.g., four protrusions 602 defining four openings 610) extending between a base ring 604 and an apex 606. The protrusions 602 may exhibit a tapered shape, as discussed above, and may curve in a manner similar to the protrusions 412 discussed above. While specific embodiments of the disclosure illustrate three or four protrusions 602, other embodiments may include any suitable number of protrusions 602.

As will be understood by those skilled in the art who have the benefit of the instant disclosure, other equivalent or alternative compositions, devices, processes, methods, and downhole pump systems with a single-piece cylindrical casing with circumferentially-elongated flow-passages can be envisioned without departing from the description contained in this application. Accordingly, the manner of carrying out the disclosure as shown and described is to be construed as illustrative only.

Persons skilled in the art can make various changes in the shape, size, number, and/or arrangement of features without departing from the scope of the instant disclosure. For example, In addition, the size of a feature and/or part can be scaled up or down to suit the needs and/or desires of a practitioner. Each disclosed process, system, method, and method step can be performed in association with any other disclosed method or method step and in any order according to some embodiments. Where the verb "may" appears, it is intended to convey an optional and/or permissive condition, but its use is not intended to suggest any lack of operability unless otherwise indicated. Where open terms such as "having" or "comprising" are used, one of ordinary skill in the art having the benefit of the instant disclosure will appreciate that the disclosed features or steps optionally can be combined with additional features or steps. Such option may not be exercised and, indeed, in some embodiments, disclosed systems, compositions, apparatuses, and/or methods can exclude any other features or steps beyond those disclosed in this application. Elements, compositions, devices, systems, methods, and method steps not recited can be included or excluded as desired or required. Persons skilled in the art can make various changes in methods of preparing and using a composition, device, and/or system of the disclosure.

Also, where ranges have been provided, the disclosed endpoints can be treated as exact and/or approximations as desired or demanded by the particular embodiment. Where the endpoints are approximate, the degree of flexibility can vary in proportion to the order of magnitude of the range. For example, on one hand, a range endpoint of about 50 in the context of a range of about 5 to about 50 can include 50.5, but not 52.5 or 55 and, on the other hand, a range endpoint of about 50 in the context of a range of about 0.5 to about 50 can include 55, but not 60 or 75. In addition, it can be desirable, in some embodiments, to mix and match range endpoints. Also, in some embodiments, each figure disclosed (e.g., in one or more of the examples, tables, and/or drawings) can form the basis of a range (e.g., depicted value+/−about 10%, depicted value+/−about 50%, depicted value+/−about 100%) and/or a range endpoint. With respect to the former, a value of 50 depicted in an example, table, and/or drawing can form the basis of a range of, for example, about 45 to about 55, about 25 to about 100, and/or about 0 to about 100. Disclosed percentages are volume percentages except where indicated otherwise.

All or a portion of a downhole pump systems and methods with a single-piece cylindrical casing with; a profiled ballrace, a concave ball-stop, embedded ball-race guides, and converging-diverging circumferentially-elongated flow-passages, can be configured and arranged to be disposable, serviceable, interchangeable, and/or replaceable.

Any equivalents and alternatives along with obvious changes and modifications are intended to be included within the scope of the present disclosure. Accordingly, the foregoing disclosure is intended to be illustrative, but not limiting, of the scope of the disclosure as illustrated by the appended claims.

The title, abstract, background, and headings are provided in compliance with regulations and/or for the convenience of the reader. They include no admissions as to the scope and content of prior art and no limitations applicable to all disclosed embodiments.

What is claimed is:

1. A valve assembly comprising:
    a restriction element;
    a casing defining an internal flow path through the casing, the casing comprising at least one axial connection for connecting with a component of a fluid-handling device;
    an insert disposed in the internal flow path through the casing, an outer surface of the insert being fixedly engaged with an inner surface the casing, the insert comprising at least three axially extending protrusions, each of the at least three axially extending protrusions individually extending inward into the internal flow path of the casing and converging at an apex of the insert to define a cage in which the restriction element is configured to move axially through the internal flow path, wherein the at least three axially extending protrusions each exhibit a curved profile that extends inward in a radial direction to meet at the apex, the apex extending through a longitudinal axis of the insert and configured to obstruct the internal flow path at the longitudinal axis, the at least three axially extending protrusions defining laterally inward openings positioned about the apex, and wherein the at least three axially extending protrusions have a lateral width extending along a circumference of the insert that gradually reduces along substantially an entire length as the at least three axially extending protrusions extend in a longitudinal direction along a spiral path toward the apex; and
    a seat positioned opposite to the apex of the insert to contain the restriction element in the insert, the at least three axially extending protrusions exhibiting a diameter at the apex that is less than an internal diameter of the seat;
    wherein:
        in an open position, the restriction element is configured to be displaced toward the apex of the insert to enable fluid flow through the internal flow path and through the laterally inward openings defined between the at least three axially extending protrusions; and
        in a closed position, the restriction element is configured to engage with the seat to restrict fluid flow through the internal flow path.
2. The valve assembly of claim 1, wherein at least some of the at least three axially extending protrusions exhibit a spiral shape as the at least some of the at least three axially extending protrusions extend from a base portion of the insert in a counterclockwise direction to the apex of the insert.
3. The valve assembly of claim 2, wherein the at least some of the at least three axially extending protrusions exhibit the spiral shape along an entire length that curves along a circumference of the insert.
4. The valve assembly of claim 1, wherein the insert comprises a ring opposite the apex and the at least three axially extending protrusions extend from the ring to the apex.
5. The valve assembly of claim 1, wherein an entirety of an outermost diameter of the insert is secured to the casing with an interference fit to provide fluid sealing and balancing of forces between the outermost diameter of the insert and an inner diameter of the casing.
6. The valve assembly of claim 1, wherein the insert is configured to be secured in the casing in a manner that cannot be removed without deforming the insert and/or the casing.
7. The valve assembly of claim 1, wherein a base portion of the insert comprises a tapered surface that abuts with a complementary tapered surface of the casing.
8. The valve assembly of claim 1, wherein the apex comprises a frustoconical shape having an internal concave surface configured to engage a surface of the restriction element.
9. The valve assembly of claim 8, wherein the at least some of the at least three axially extending protrusions exhibit a lateral width extending along a circumference of the insert that tapers as the at least some of the at least three axially extending protrusions extend radially inward toward the longitudinal axis.
10. The valve assembly of claim 1, wherein at least one of the casing or the insert comprises a material including a low alloy steel, a brass alloy, a stainless steel alloy, a duplex stainless steel, a nickel base alloy, a nickel alloy, or a super alloy.
11. The valve assembly of claim 1, wherein at least one of the casing or the insert comprises a material including a surface treatment including at least one of electroplating, an electroless plating, a chemical vapor deposition, a physical vapor deposition, a plasma coating, a spray-metal coating, a solid-state diffusion treatment, or a surface heat-treat process.
12. The valve assembly of claim 1, wherein at least one of the casing or the insert comprises is machined from at least one of a bar stock, a powder-sintered blank, a casted blank, or a forged blank, wherein an outside diameter of the casing is about 1 inch to about 6 inches and a length of the casing is about 3 inches to about 10 inches.
13. The valve assembly of claim 1, wherein at least one of the casing or the insert comprises is machined from at least one of a bar stock, a powder-sintered blank, a casted blank, or a forged blank, wherein an outside diameter of the insert is about 0.5 inch to about 4 inches and a length of the insert is about 1 inches to about 6 inches.
14. A downhole pump comprising:
    a barrel comprising an interior cavity;
    a plunger;
    a valve rod mechanically connected to the plunger and configured to drive the plunger within the interior cavity of the barrel; and
    at least one valve assembly comprising the valve assembly of claim 1.
15. The valve assembly of claim 1, wherein the insert comprises a base ring, the base ring including scallop cutouts leading into the laterally inward openings defined between the at least three axially extending protrusions, the scallop cutouts configured to provide a relatively larger volume for diverging the fluid flow when the valve assembly is in the open position.

16. The valve assembly of claim 15, wherein an uphole portion of the valve assembly is configured to converge the fluid flow after the fluid flow is diverged by the scallop cutouts.

17. A valve assembly comprising:
   a restriction element;
   a casing defining an internal flow path through the casing, the casing comprising at least one axial connection for connecting with a component of a fluid-handling device;
   an insert disposed in the internal flow path through the casing, an outer surface of the insert being fixedly engaged with an inner surface the casing, the insert comprising at least three axially extending protrusions, each of the at least three axially extending protrusions individually extending along a longitudinal axis of the insert inward into the internal flow path of the casing and converging at an apex of the insert to define a cage in which the restriction element is configured to move axially through the internal flow path, the apex extending through the longitudinal axis and configured to obstruct the internal flow path along the longitudinal axis, the at least three axially extending protrusions at least partially defining laterally inward quartic lima bean-shaped openings positioned about the apex; and
   a seat positioned opposite to the apex of the insert to contain the restriction element in the insert;
   wherein:
      in an open position, the restriction element is configured to be displaced toward the apex of the insert to enable fluid flow through the internal flow path and through the laterally inward quartic lima bean-shaped openings defined between the at least three axially extending protrusions; and
      in a closed position, the restriction element is configured to engage with the seat to restrict fluid flow through the internal flow path.

18. The valve assembly of claim 17, wherein the at least three axially extending protrusions have a lateral width extending along a circumference of the insert that gradually reduces along a majority of a length that the at least three axially extending protrusions extend in a longitudinal direction toward the apex.

19. A valve assembly comprising:
   a restriction element;
   a casing defining an internal flow path through the casing, the casing comprising at least one axial connection for connecting with a component of a fluid-handling device;
   an insert disposed in the internal flow path through the casing, an outer surface of the insert being fixedly engaged with an inner surface the casing, the insert comprising at least three axially extending protrusions, each of the at least three axially extending protrusions individually extending inward into the internal flow path of the casing and converging with at least another of the at least three axially extending protrusions at an apex of the insert to define a cage in which the restriction element is configured to move axially through the internal flow path; and
   a base ring including scallop cutouts leading into laterally inward quartic lima bean-shaped openings defined between the at least three axially extending protrusions, the scallop cutouts configured to provide a relatively larger volume for diverging fluid flow;
   wherein:
      in an open position, the restriction element is configured to be displaced toward the apex of the insert to enable fluid flow through the internal flow path and through the laterally inward quartic lima bean-shaped openings exhibiting a non-circular and a non-oval cross section defined between the at least three axially extending protrusions; and
      in a closed position, the restriction element is configured to restrict fluid flow through the internal flow path.

20. The valve assembly of claim 19, wherein an uphole portion of the valve assembly is configured to converge the fluid flow after the fluid flow is diverged by the scallop cutouts.

* * * * *